(12) United States Patent
Imade et al.

(10) Patent No.: US 10,402,497 B2
(45) Date of Patent: Sep. 3, 2019

(54) PROCESSING METHOD, PROCESSING APPARATUS, AND RECORDING MEDIUM

(71) Applicant: Panasonic Intellectual Property Management Co., Ltd., Osaka (JP)

(72) Inventors: Masahiro Imade, Tokyo (JP); Masaki Yamauchi, Osaka (JP); Nanami Fujiwara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/962,628

(22) Filed: Apr. 25, 2018

(65) Prior Publication Data
US 2018/0365234 A1  Dec. 20, 2018

(30) Foreign Application Priority Data

Jun. 19, 2017 (JP) ................. 2017-119766

(51) Int. Cl.
*G06F 17/28* (2006.01)
*G10L 21/00* (2013.01)
*G10L 25/00* (2013.01)
*G06N 20/00* (2019.01)

(52) U.S. Cl.
CPC ........ *G06F 17/2854* (2013.01); *G06F 17/289* (2013.01); *G06F 17/2809* (2013.01); *G06F 17/2845* (2013.01); *G06N 20/00* (2019.01); *G06F 17/2863* (2013.01)

(58) Field of Classification Search
CPC ............. G06F 17/2809; G06F 17/2845; G06F 17/2854; G06F 17/2863; G06F 17/289; G06N 20/00

USPC ................................. 704/2, 4, 277
See application file for complete search history.

(56) References Cited

U.S. PATENT DOCUMENTS

| 9,009,030 B2* | 4/2015 | Wang .............. G06F 17/273 704/10 |
| 2008/0208565 A1* | 8/2008 | Bisegna .......... G06F 17/28 704/4 |
| 2009/0204386 A1* | 8/2009 | Seligman .......... G06F 17/2755 704/2 |

(Continued)

FOREIGN PATENT DOCUMENTS

| JP | 2000-148756 | 5/2000 |
| JP | 2016-194822 | 11/2016 |

*Primary Examiner* — Khai N. Nguyen
(74) *Attorney, Agent, or Firm* — Greenblum & Bernstein, P.L.C.

(57) ABSTRACT

A processing method includes acquiring first parallel text data which is a pair of a first text described in a first language and a first translation of the first text into a second language; evaluating whether the first parallel text data has a possibility of mistranslation on the basis of words included in the first text and the first translation; and outputting information based on the evaluation result. It is evaluated whether the first parallel text data has a possibility of mistranslation on the basis of results of (1) a first determination as to whether the first text includes either or both of a word with a first meaning and an antonym of the word and (2) a second determination as to whether the first translation includes either or both of a translation word with the first meaning and an antonym of the translation word.

17 Claims, 8 Drawing Sheets

---

| | | ~D1 |
|---|---|---|
| | | ~D2 |
| Input Text | 右手にある置物を過ぎると、入り口がございます | |
| | (Pass the ornament on the <u>right</u> hand side there is the entrance.) | |
| Translation result | Pass the ornament on the <u>left</u> hand side there is the entrance. | |
| | Risk level: 2  [A mistranslation may occur] | |
| | The meanings of 'left' and 'right' in the translation result may be set to the reverse meanings. | |
| | Check the translation also with reference to the reference translation examples. | |
| | | ~D3 |
| [Reference translation results] | | |
| Reference text example 1 | 右にある置物の前を通っていくと、入り口がございます | |
| | (If you pass through the ornament on the <u>right</u> side there is the entrance.) | |
| Reference translation 1 | If you pass through the ornament on the <u>right</u> side there is the entrance. | |
| Reference text example 2 | 右の置物を通り過ぎます。入り口がございます。 | |
| | (Pass the ornament on the <u>right</u>. There is the entrance.) | |
| Reference translation 2 | Pass the ornament on the <u>right</u>. There is the entrance. | |

(56) References Cited

U.S. PATENT DOCUMENTS

| | | | |
|---|---|---|---|
| 2012/0173222 A1* | 7/2012 | Wang | G06F 17/273 |
| | | | 704/2 |
| 2014/0172411 A1* | 6/2014 | Kim | G06F 17/2854 |
| | | | 704/2 |
| 2017/0364512 A1* | 12/2017 | Han | G06F 17/2881 |
| 2018/0365234 A1* | 12/2018 | Imade | G06F 17/2809 |
| 2019/0018842 A1* | 1/2019 | Nomura | G06F 17/289 |

* cited by examiner

| DETERMINATION CONDITION NO. | DETERMINATION CONDITION | | | | DETERMINATION RESULT CLASSIFICATION | RECOMMENDED ADDRESSING METHOD |
|---|---|---|---|---|---|---|
| | PRESENCE/ABSENCE OF JAPANESE WORD | | PRESENCE/ABSENCE OF ENGLISH WORD | | | |
| | 右 (RIGHT) | 左 (LEFT) | RIGHT | LEFT | | |
| 1 | P | P | P | P | INDUCING SWITCHING BETWEEN 'LEFT' AND 'RIGHT' | MODIFY TEXTS SO THAT TEXTS INCLUDE ONLY '右' (RIGHT) AND 'RIGHT' OR ONLY '左' (LEFT) AND 'LEFT', OR DELETE TEXTS FROM CORPUS |
| 2 | P | A | A | P | MISTAKE IN PARALLEL TEXTS | MODIFY MISTRANSLATION OR DELETE TEXTS FROM CORPUS |
| 3 | A | P | P | A | MISTAKE IN PARALLEL TEXTS | MODIFY MISTRANSLATION OR DELETE TEXTS FROM CORPUS |
| 4 | P | – | A | – | FREE TRANSLATION, IDIOM, OR MISTAKE IN PARALLEL TEXTS | CHECK TEXTS INDIVIDUALLY, AND MODIFY OR DELETE INAPPROPRIATE TEXTS |
| 5 | – | P | – | A | FREE TRANSLATION, IDIOM, OR MISTAKE IN PARALLEL TEXTS | CHECK TEXTS INDIVIDUALLY, AND MODIFY OR DELETE INAPPROPRIATE TEXTS |
| 6 | A | – | P | – | POLYSEMY OF 'RIGHT' OR MISTAKE IN PARALLEL TEXTS | CHECK TEXTS INDIVIDUALLY, AND MODIFY OR DELETE INAPPROPRIATE TEXTS, OR USE TEXTS AS IT IS |
| 7 | – | A | – | P | POLYSEMY OF 'LEFT' OR MISTAKE IN PARALLEL TEXTS | CHECK TEXTS INDIVIDUALLY, AND MODIFY OR DELETE INAPPROPRIATE TEXTS, OR USE TEXTS AS IT IS |

P: PRESENT IN TEXT   A: ABSENT IN TEXT   –: NO PRESENCE/ABSENCE DETERMINATION

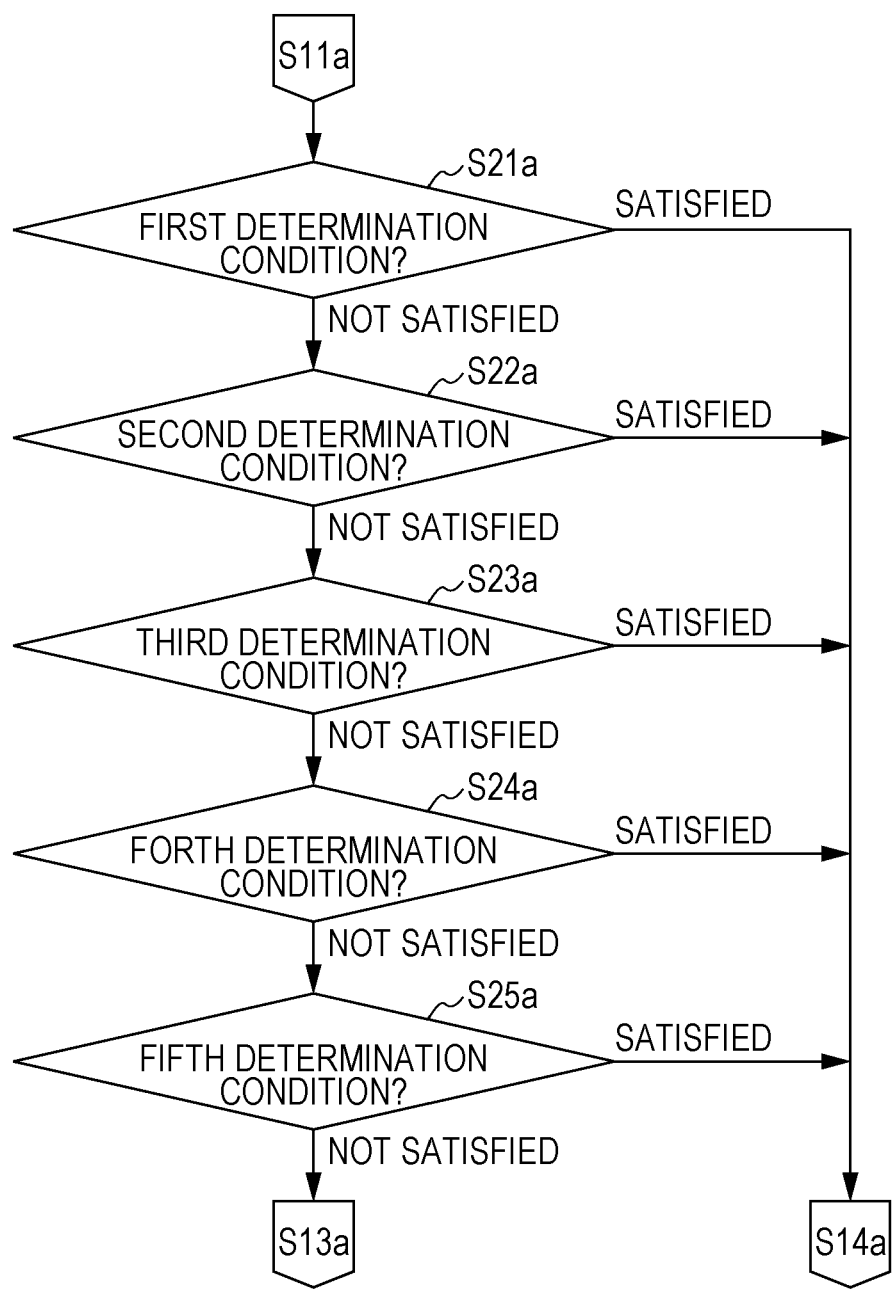

FIG. 8

| | |
|---|---|
| Input Text | 右手にある置物を過ぎると、入リ口がございます<br>(Pass the ornament on the right hand side there is the entrance.) |
| Translation result | Pass the ornament on the left hand side there is the entrance.<br>Risk level: 2 [A mistranslation may occur]<br>The meanings of "left" and "right" in the translation result may be set to the reverse meanings.<br>Check the translation also with reference to the reference translation examples. |
| [Reference translation results] | |
| Reference text example 1 | 右にある置物の前を通っていくと、入リ口がございます<br>(If you pass through the ornament on the right side there is the entrance.) |
| Reference translation 1 | If you pass through the ornament on the right side there is the entrance. |
| Reference text example 2 | 右の置物を通り過ぎます。入リ口がございます。<br>(Pass the ornament on the right. There is the entrance.) |
| Reference translation 2 | Pass the ornament on the right. There is the entrance. |

D1, D2, D3

PROCESSING METHOD, PROCESSING APPARATUS, AND RECORDING MEDIUM

BACKGROUND

1. Technical Field

The present disclosure relates to a processing method, a processing apparatus, and a recording medium which process parallel text data (parallel texts) including an input text described in a first language and a translation of the input text into the second language. For example, the present disclosure relates to a machine translation technique for suppressing mistranslation of antonyms in parallel texts including antonyms and for calling attention to the mistranslation of antonyms.

2. Description of the Related Art

Recently, machine translation in which a text in a first language is translated into a text in a second language different from the first language has been studied and developed. Especially, statistical machine translation and neural machine translation have come into widespread, practical use. Both the statistical machine translation and the neural machine translation are machine translation systems as described below. In the machine translation systems, a machine learning model in which knowledge necessary for translation is accumulated is generated through machine learning, and the model is used to perform translation. In the machine learning, a set of parallel texts (parallel corpus) constituted by a large number of pairs of a first-language text and a corresponding second-language text is used as training data.

With respect to the machine translation described above, an apparatus which detects errors in parallel texts is disclosed in Japanese Unexamined Patent Application Publication No. 2000-148756. The apparatus includes a text input unit that inputs an original text and its translation, an information extracting unit that extracts original text information from the original text and extracts translation information from the translation, a comparison unit that compares the original text information with the translation information, an error rate calculating unit that calculates the error rate of the translation on the basis of the comparison result from the comparison unit, and an informing unit that informs a user of parallel texts having a translation with a high error rate.

A server is disclosed in Japanese Unexamined Patent Application Publication No. 2016-194822. The server includes a text acquiring unit that acquires text content data including parallel texts, a morpheme analyzing unit that decomposes the text content data into each word, a dictionary check unit that refers to a check dictionary having parallel texts and checks if the parallel texts in the text content are appropriate, a substitute word searching unit that, when it is determined that use of at least one of words which are a pair of an original word and its translation is not appropriate, searches, over a network, a substitute word used instead of the inappropriate word, and a presentation unit that presents the inappropriate word and the substitute word in association with each other.

SUMMARY

However, in the related art described above, no consideration is given about a method of processing parallel texts including antonyms. It is necessary for the method of processing parallel texts including antonyms to be further improved.

In one general aspect, the techniques disclosed here feature a processing method for a processing apparatus which processes parallel text data. The parallel text data includes an input text described in a first language and a translation of the input text into a second language. The method includes acquiring first parallel text data which is a pair of a first text described in the first language and a first translation of the first text into the second language; evaluating whether or not the first parallel text data is parallel text data having a possibility of mistranslation on the basis of words included in the first text and the first translation; and outputting information based on a result of the evaluation. The evaluation is performed on the basis of results of (1) a first determination as to whether or not the first text includes either or both of a word with a first meaning and an antonym of the word and (2) a second determination as to whether or not the first translation includes either or both of a translation word with the first meaning and an antonym of the translation word.

According to the present disclosure, the possibility of a mistranslation of parallel texts including antonyms may be easily and appropriately evaluated.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an exemplary determination table for determining parallel texts inducing a mistranslation between 'left' and 'right' and for describing concrete examples of first to seventh determination conditions used in the mistranslation-possibility evaluation process illustrated in FIG. 3;

FIG. 7 is a flowchart of an exemplary mistranslation-possibility evaluation process illustrated in FIG. 6; and FIG. 8 is a diagram illustrating an exemplary alert information screen displayed on a display unit of the translation processing apparatus illustrated in FIG. 5.

DETAILED DESCRIPTION

Figure 1:
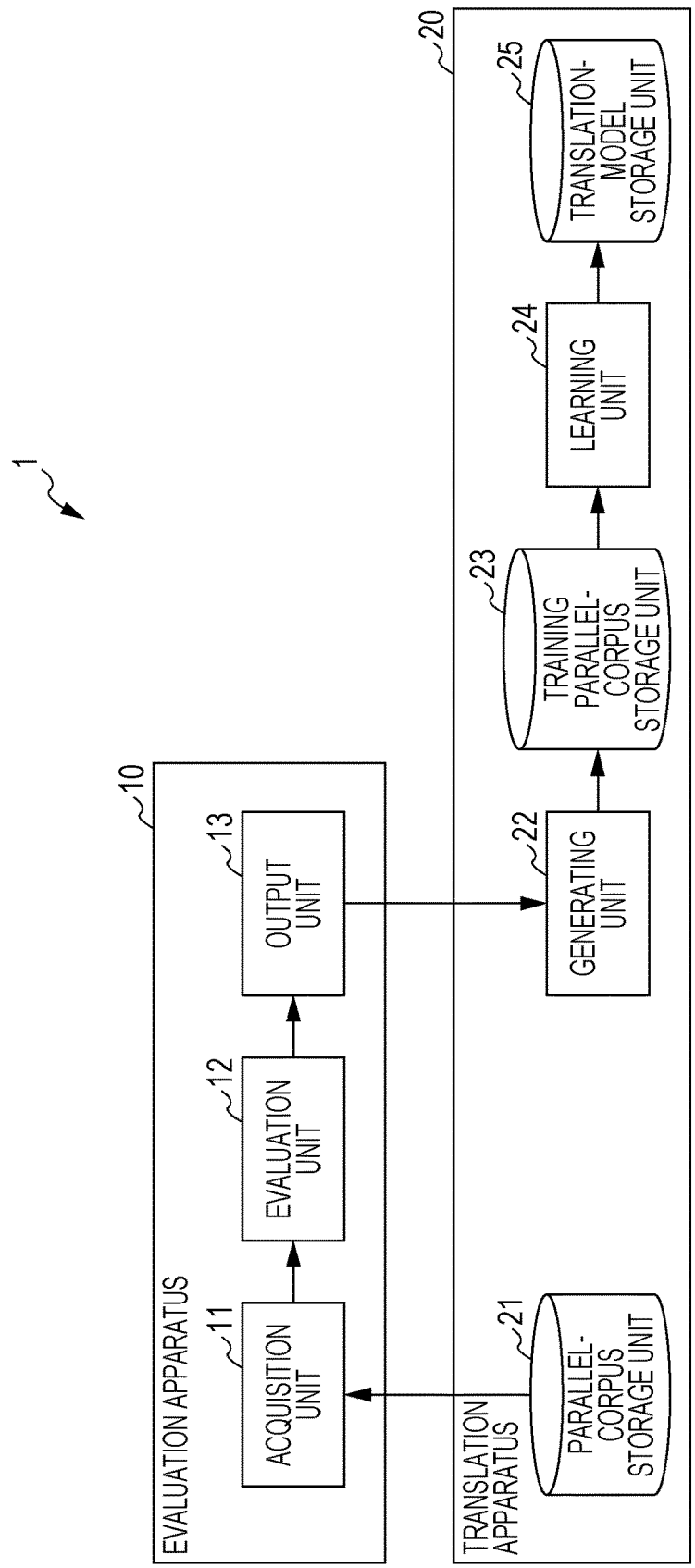
FIG. 1 is a block diagram illustrating an exemplary configuration of a translation processing apparatus according to a first embodiment of the present disclosure.

Underlying Knowledge Forming Basis of the Present Disclosure

While the performance of a machine translation system of the related art has been remarkably improved these days, the machine translation system may output a translation result which is out of the question. For example, mistranslation (hereinafter referred to as "mistranslation of 'left'-'right' antonyms") in which a first-language word that means 'right' is translated into a second-language word that means 'left', or in which, on the contrary, a first-language word that means 'left' is translated into a second-language word that means 'right' may occur in some rare cases. This is a fatal error in route guidance use or operation instruction use.

There are two reasons why the mistranslation of 'left'-'right' antonyms occurs. The first reason is that, since parallel texts used in generation of a machine learning model are typically prepared through manual operations, even when meticulous attention is paid, a slight amount of mistranslation occurs due to human errors. The second reason is that there are some parallel texts which are correct as parallel texts but which may cause a mistranslation. That is, such parallel texts may cause 'left' or 'right' to be wrongly learned as its antonym in machine learning, or may cause a word with a meaning of 'left' or 'right' to be learned in association with a word with another meaning.

For example, assume parallel texts in which a single text includes both words with the meanings of 'hidari' (left) and 'migi' (right) (hereinafter referred to as "'left'-'right' coexistence texts"), such as "Migi ni magaruto, hidari ni tatemono ga arimasu (Turn right, and there will be a building on the left)/Turn right, and there will be a building on the left." In this case, 'migi' (right) may be learned as being highly relevant to 'left', and 'hidari' (left) may be learned as being highly relevant to 'right'. In addition, assume parallel texts which have a text, in the same language, including neither 'left' nor 'right' but which include a polysemous word such as 'right' in "Wakatta, hidari ni ikuyo (All right, I will go left)/All right, I will go left" (hereinafter referred to as "'left'-'right' polysemous-word including texts"). In this case, it is not possible for a possibility of learning 'hidari' (left) and 'right' as being highly relevant to each other to be eliminated.

In Japanese Unexamined Patent Application Publications No. 2000-148756 and No. 2016-194822, methods of detecting an error in parallel texts are disclosed. By using these methods, a mistranslation due to a human error may be detected. However, the 'left'-'right' coexistence texts or the 'left'-'right' polysemous-word including texts are correct as parallel texts. Therefore, the techniques in Japanese Unexamined Patent Application Publications No. 2000-148756 and No. 2016-194822 are not capable of detecting such texts.

When only a translation function of a machine translation system is provided from the outside, parallel texts used in generation of a machine learning model are not capable of being controlled. Therefore, it is not possible to avoid a mistranslation in application of the techniques in Japanese Unexamined Patent Application Publications No. 2000-148756 and No. 2016-194822.

One non-limiting and exemplary embodiment provides, for example, a processing apparatus which includes a machine learning model in which, compared with the related art, occurrence of mistranslations (such as mistranslations of 'left'-'right' antonyms) due to parallel texts including antonyms is suppressed. In addition, one non-limiting and exemplary embodiment provides, for example, a processing apparatus which, when a translation result possibly includes a mistranslation (such as a mistranslation of 'left'-'right' antonyms) due to parallel texts including antonyms, may call attention to this fact, and may present a hint leading a user of the translation apparatus to a correct translation.

In view of the reasons of occurrence of, for example, mistranslations of 'left'-'right' antonyms, the present disclosure is made as described below. For example, a parallel corpus is used as training data in generation of a machine learning model of a translation apparatus. A combination of information about whether or not an input text in a first language includes an antonym (for example, a word with a meaning of 'right' or 'left') and information about whether or not a translation in a second language includes an antonym (for example, a word with a meaning of 'right' or 'left') is used to extract, for deletion or modification, parallel texts in advance. For example, the extracted parallel texts are parallel texts ('left'-'right' mistranslation inducing parallel texts), with which 'left' or 'right' may be learned as a wrong antonym, such as parallel texts including the obvious parallel-text errors described above, the 'left'-'right' coexistence texts, or the 'left'-'right' polysemous-word including texts. Thus, occurrence of learning, for example, 'left' or 'right' as a wrong antonym may be suppressed. Compared with the related art, occurrence of mistranslations, such as mistranslations of 'left'-'right' antonyms, in a translation result from the translation apparatus may be suppressed.

In the present disclosure, for example, in use of various translation apparatuses, a combination of information about whether or not an input text in a first language includes an antonym (for example, a word with a meaning of 'right' or 'left') and information about whether or not a translation in a second language includes an antonym (for example, a word with a meaning of 'right' or 'left') is used to judge the stage of a possibility of mistranslation, such as a possibility of 'left'-'right' mistranslation, in a machine translation result. Alert information according to the determination result is presented along with the translation result. More preferably, a similar text (reference example text) to the input text and its machine translation result (reference translation) may be also added to the alert information. Thus, a user of the translation apparatus may refer to the alert information, the reference example text, and the reference translation which are presented. Accordingly, the user may overall determine whether or not the translation result includes a mistranslation such as a 'left'-'right' mistranslation. Thus, an easy acceptance of a mistranslation such as a 'left'-'right' mistranslation may be avoided.

On the basis of the underlying knowledge described above, the inventors have made an earnest study about how to process parallel texts (parallel text data) including antonyms. As a result of the study, the inventors have completed the following disclosure.

A processing method according to one aspect of the present disclosure is a method for a processing apparatus which processes parallel text data. The parallel text data includes an input text described in a first language and a translation of the input text into a second language. The method includes acquiring first parallel text data which is a pair of a first text described in the first language and a first translation of the first text into the second language; evaluating whether or not the first parallel text data is parallel text data having a possibility of mistranslation on the basis of words included in the first text and the first translation; and outputting information based on a result of the evaluation. The evaluation is performed on the basis of results of (1) a first determination as to whether or not the first text includes either or both of a word with a first meaning and an antonym of the word and (2) a second determination as to whether or not the first translation includes either or both of a translation word with the first meaning and an antonym of the translation word.

In this configuration, first parallel text data which is a pair of a first text described in a first language and a first translation that is a translation of the first text into the second language is acquired. On the basis of the results of (1) the first determination as to whether or not the first text includes either or both of a word with a first meaning and its antonym and (2) the second determination as to whether the first translation includes either or both of a word with the first meaning and its antonym, it is evaluated whether or not the first parallel text data has a possibility of mistranslation. Information based on the evaluation result is output. This configuration achieves an easy, appropriate evaluation of a possibility of mistranslation due to parallel texts including antonyms, that is, a possibility that a translation error is induced in translation and a possibility that a translation result includes a translation error.

The evaluation may be performed on the basis of the results of (1) the first determination as to whether or not the first text includes the word with the first meaning and the antonym of the word and (2) the second determination as to whether or not the first translation includes the translation word with the first meaning and the antonym of the translation word.

In this configuration, on the basis of the results of (1) the first determination as to whether or not a first text includes both of the word with the first meaning and its antonym and (2) the second determination as to whether or not the first translation includes both of the word with the first meaning and its antonym, it is evaluated whether or not the first parallel text data has a possibility of mistranslation. This configuration achieves an easy, appropriate extraction of parallel texts that are likely to induce a mistranslation.

The evaluation may be performed on the basis of the results of (1) the first determination as to whether or not the first text includes a first word and excludes a second word and (2) the second determination as to whether or not the first translation excludes a first translation word and includes a second translation word. The first word is either the word with the first meaning or the antonym of the word. The second word is a word other than the first word between the word with the first meaning and the antonym of the word. The first translation word is a translation of the first word. The second translation word is a translation of the second word.

In this configuration, on the basis of the results of (1) the first determination as to whether or not the first text includes a first word that is either the word with the first meaning or its antonym and excludes the other second word and (2) the second determination as to whether or not the first translation excludes the first translation word which is a translation of the first word and includes the second translation word which is a translation of the second word, it is evaluated whether or not the first parallel text data has a possibility of mistranslation. This configuration achieves an easy, appropriate extraction of parallel texts that are highly likely to have a possibility of mistranslation.

The evaluation may be performed on the basis of the results of (1) the first determination as to whether or not the first text includes a first word that is either the word with first meaning or the antonym of the word and (2) the second determination as to whether or not the first translation excludes a first translation word that is a translation of the first word.

In this configuration, on the basis of the results of (1) the first determination as to whether or not the first text includes the first word which is either the word with the first meaning or its antonym and (2) the second determination as to whether or not the first translation excludes the first translation word which is a translation of the first word, it is evaluated whether or not the first parallel text data has a high possibility of mistranslation. This configuration achieves an easy, appropriate extraction of parallel texts having a high possibility of mistranslation.

The evaluation may be performed on the basis of the results of (1) the first determination as to whether or not the first text excludes a first word that is either the word with the first meaning or the antonym of the word and (2) the second determination as to whether or not the first translation includes a first translation word that is a translation of the first word.

In this configuration, on the basis of the results of (1) the first determination as to whether or not the first text excludes the first word which is either the word with the first meaning or its antonym and (2) the second determination as to whether or not the first translation includes the first translation word which is a translation of the first word, it is evaluated whether or not the first parallel text data has a possibility of mistranslation. This configuration achieves an easy, appropriate extraction of parallel texts which has a possibility of mistranslation although the possibility is low.

The acquisition may acquire the first parallel text data from a parallel-corpus storage unit, and the parallel-corpus storage unit may store a parallel corpus including a plurality of pairs of a text described in the first language and a translation of the first-language text into the second language.

In this configuration, the first parallel text data is acquired from the parallel-corpus storage unit storing a parallel corpus including multiple pairs of a text described in the first language and a translation of the first-language text into the second language. This configuration achieves an easy, appropriate extraction of parallel texts which are highly likely to induce a translation error in translation, among the multiple pieces of parallel text data stored in the parallel-corpus storage unit.

The outputting may generate a training parallel corpus on the basis of the evaluation result.

In this configuration, on the basis of the evaluation result, a training parallel corpus is generated. Parallel texts that are highly likely to induce a translation error in translation are modified or deleted. This configuration achieves generation of a training parallel corpus which excludes parallel texts that are highly likely to induce a translation error in translation.

The outputting may generate the training parallel corpus in such a manner that, on the basis of the evaluation result, the parallel text data having no possibility of mistranslation is employed for the training parallel corpus, and that the parallel text data having the possibility of mistranslation is not employed for the training parallel corpus.

In this configuration, on the basis of the evaluation result, parallel text data having no possibility of mistranslation is employed for the training parallel corpus, and parallel text data having a possibility of mistranslation is not employed for the training parallel corpus. Thus, the training parallel corpus is generated. This configuration achieves generation of a training parallel corpus which excludes parallel texts which are likely to induce a translation error in translation.

The outputting may generate the training parallel corpus in such a manner that, on the basis of the evaluation result, the parallel text data having no possibility of mistranslation is employed for the training parallel corpus and that modified parallel text data is employed for the training parallel corpus. The modified parallel text data is obtained by modifying the parallel text data having the possibility of mistranslation. The modification is made in such a manner that the parallel text data does not have the possibility of mistranslation.

In this configuration, on the basis of the evaluation result, parallel text data having no possibility of mistranslation is employed for the training parallel corpus, and modified parallel text data obtained by modifying parallel text data having a possibility of mistranslation so that the parallel text data has no possibility of mistranslation is employed for the training parallel corpus. Thus, the training parallel corpus is generated. This configuration achieves generation of a training parallel corpus which includes a large number of pieces of data that excludes parallel texts which are likely to induce a translation error in translation.

The training parallel corpus may be used to learn a translation model.

In this configuration, a translation model is learned by using the training parallel corpus which excludes parallel text data that is likely to induce a translation error in translation. The configuration achieves suppression of occurrence of mistranslations, such as mistranslations of 'left'-'right' antonyms, in a translation result obtained by using the translation model.

The acquisition may acquire the first parallel text data from a translation apparatus that translates the first text into the first translation.

In this configuration, the first parallel text data is acquired from the translation apparatus which translates the first text into the first translation. Thus, a user may overall determine whether or not the translation result includes a translation error such as a 'left'-'right' mistranslation. This configuration enables a user's easy acceptance of a mistranslation such as a 'left'-'right' mistranslation to be avoided.

The outputting may generate, for display, alert information on the basis of the evaluation result.

In this configuration, on the basis of the evaluation result, alert information is generated and displayed. Thus, a user may determine whether or not the translation result includes a translation error such as a 'left'-'right' mistranslation on the basis of the alert information. This configuration enables a user's easy acceptance of a mistranslation such as a 'left'-'right' mistranslation to be avoided without fail.

The outputting may generate first alert information and second alert information as the alert information on the basis of the evaluation result. The first alert information indicates a first possibility as the possibility of mistranslation. The second alert information indicates, as the possibility of mistranslation, a second possibility which is higher than the first possibility.

In this configuration, on the basis of the evaluation result, both first alert information indicating a first possibility as a possibility of mistranslation and second alert information indicating a second possibility, which is higher than the first possibility, as a possibility of mistranslation are generated as the alert information. Thus, the stage of a possibility of mistranslation, such as a possibility of 'left'-'right' mistranslation, in the translation result may be displayed. Therefore, a user may judge a stage indicating whether or not the translation result includes a translation error such as a 'left'-'right' mistranslation. This configuration enables a user's easy acceptance of a mistranslation such as a 'left'-'right' mistranslation to be avoided without fail.

The outputting may generate, for display, a reference translation example on the basis of the evaluation result. The reference translation example may be added to the alert information.

In this configuration, on the basis of the evaluation result, a reference translation example is generated and displayed in addition to the alert information. Thus, by using the alert information and the reference translation example, a user may overall determine whether or not the translation result includes a translation error such as a 'left'-'right' mistranslation. This configuration enables a user's easy acceptance of a mistranslation such as a 'left'-'right' mistranslation to be avoided without fail.

A word included in the first text or the first translation may indicate 'right' or 'left'.

In this configuration, the first parallel text data is acquired from the parallel-corpus storage unit. When a translation model is learned by using the training parallel corpus that excludes parallel text data which is likely to induce a translation error in translation, occurrence of mistranslations of 'left'-'right' antonyms in a translation result obtained by using the translation model may be suppressed. When the first parallel text data is acquired from the translation apparatus which translates the first text into the first translation, the user may overall determine whether or not the translation result from the translation apparatus includes a 'left'-'right' mistranslation. This configuration enables a user's easy acceptance of a 'left'-'right' mistranslation to be avoided.

The present disclosure may be implemented not only as a processing method of performing the characteristic processes described above, but also as a processing apparatus with a characteristic configuration corresponding to the characteristic processes performed in the processing method. In addition, the present disclosure may be implemented as a computer program for causing a computer to perform the characteristic processes included in the processing method. Therefore, another aspect described below may have substantially the same effect to the processing method described above.

A processing apparatus according to another aspect of the present disclosure processes parallel text data. The parallel text data includes an input text described in a first language and a translation of the input text into a second language. The apparatus includes an acquiring unit, an evaluation unit, and an output unit. The acquiring unit acquires first parallel text data which is a pair of a first text described in the first language and a first translation of the first text into the second language. The evaluation unit evaluates whether or not the first parallel text data is parallel text data having a possibility of mistranslation on the basis of words included in the first text and the first translation. The output unit outputs information based on a result of the evaluation. The evaluation unit evaluates whether or not the first parallel text data is parallel text data having the possibility of mistranslation on the basis of results of (1) a first determination as to whether or not the first text includes either or both of a word with a first meaning and an antonym of the word and (2) a second determination as to whether or not the first translation includes either or both of a translation word with the first meaning and an antonym of the translation word.

A non-transitory recording medium according to another aspect of the present disclosure stores a processing program causing a computer to function as a processing apparatus. The processing apparatus processes parallel text data. The parallel text data includes an input text described in a first language and a translation of the input text into a second language. The processing program causes the computer to execute a process including acquiring first parallel text data which is a pair of a first text described in the first language and a first translation of the first text into the second language; evaluating whether or not the first parallel text data is parallel text data having a possibility of mistranslation on the basis of words included in the first text and the first translation; and outputting information based on a result of the evaluation. The evaluation is performed on the basis of results of (1) a first determination as to whether or not the first text includes either or both of a word with a first meaning and an antonym of the word and (2) a second determination as to whether or not the first translation includes either or both of a translation word with the first meaning and an antonym of the translation word.

Needless to say, the computer program described above may be distributed through a non-transitory computer-readable recording medium such as a compact disc-read-only memory (CD-ROM) or over a communication network such as the Internet. In addition, the present disclosure may be configured as a system in which some of the components of the translation processing apparatus according to the embodiments of the present disclosure and the other components are distributed to computers.

Embodiments described below indicate concrete examples of the present disclosure. Values, shapes, components, steps, the order of steps, and the like which are indicated in the embodiments described below are exemplary, and are not intended to limit the present disclosure. In addition, among the components in the embodiments described below, components which are not described in independent claims indicating the highest concept are described as any components. In addition, components in all of the embodiments may be combined with each other.

Embodiments of the present disclosure will be described below by referring to the drawings.

First Embodiment

FIG. 1 is a block diagram illustrating an exemplary configuration of a translation processing apparatus according to a first embodiment of the present disclosure. A translation processing apparatus 1 illustrated in FIG. 1 includes an evaluation apparatus 10 and a translation apparatus 20. The evaluation apparatus 10 includes an acquisition unit 11, an evaluation unit 12, and an output unit 13. The translation apparatus 20 includes a parallel-corpus storage unit 21, a generating unit 22, a training parallel-corpus storage unit 23, a learning unit 24, and a translation-model storage unit 25.

The translation processing apparatus 1 illustrated in FIG. 1 processes parallel text data (parallel texts) including an input text described in a first language and a translation of the input text into a second language. For example, as the first language, a language, such as Japanese, English, French, or German, may be employed. As the second language, a different language from the first language may be employed.

The translation processing apparatus 1 uses the evaluation apparatus 10 and the translation apparatus 20 to evaluate a possibility that parallel text data of a parallel corpus induces a translation error in translation. On the basis of the evaluation result, the translation processing apparatus 1 generates a training parallel corpus excluding parallel text data which is highly likely to induce a translation error in translation, and generates a translation model obtained through learning using the training parallel corpus. The evaluation apparatus 10 is used in the above-described process of generating a machine learning model. The translation apparatus 20 performs translation by using the translation model obtained through learning using the training parallel corpus.

The translation processing apparatus 1 is, for example, formed of one or more computers including a central processing unit (CPU), a read only memory (ROM), a random access memory (RAM), and an auxiliary storage device. The translation apparatus 20 of the translation processing apparatus 1 may be configured as a translation apparatus separate from the evaluation apparatus 10. The translation apparatus 20 may be, for example, formed of a personal digital assistant, such as a smartphone or a tablet terminal, or may be formed of a desktop computer. Alternatively, the translation apparatus 20 may be formed of a cloud server. In this case, for example, an input unit (not illustrated) which receives an input text and the like and a display unit (not illustrated) which displays a translation and the like may be formed of a personal digital assistant carried by a user or a desktop computer. The components other than these may be formed of a cloud server.

The parallel-corpus storage unit 21 of the translation apparatus 20 is formed of auxiliary storage devices and the like, and stores a parallel corpus including multiple pairs (parallel text data) of a text described in the first language (for example Japanese) and a translation of the first-language text into the second language (for example, English). The parallel text data in the parallel corpus is exemplary first parallel text data which is a pair of a first text described in the first language and the first translation which is a translation of the first text into the second language.

The acquisition unit 11 of the evaluation apparatus 10 acquires parallel text data stored in the parallel-corpus storage unit 21, and outputs the parallel text data to the evaluation unit 12. The evaluation unit 12 evaluates whether or not the parallel text data has a possibility of mistranslation, on the basis of the words included in the first text and the first translation of the parallel text data, and outputs, to the output unit 13, the evaluation result along with the parallel text data. As information based on the evaluation result, the output unit 13 outputs, to the generating unit 22 of the translation apparatus 20, the evaluation result, which indicates a possibility of mistranslation, for each parallel text data.

Specifically, the evaluation unit 12 uses a first determination condition, which is described below, to make a determination. The first determination condition includes a condition for the first text and a condition for the first translation. The condition for the first text is that the first text includes both a word with a first meaning and its antonym. The condition for the first translation is that the first translation includes both a word with the first meaning and its antonym.

In addition, the evaluation unit 12 uses second and third determination conditions, which are described below, to make determinations. The second and third determination conditions include a condition for the first text and a condition for the first translation. The condition for the first text is that the first text includes a first word which is either the word with the first meaning or its antonym, and excludes the other second word. The condition for the first translation is that the first translation excludes the first translation word which is a translation of the first word, and includes the second translation word which is a translation of the second word.

In addition, the evaluation unit 12 uses fourth and fifth determination conditions, which are described below, to make determinations. The fourth and fifth determination conditions include a condition for the first text and a condition for the first translation. The condition for the first text is that the first text includes the first word which is either the word with the first meaning or its antonym. The condition for the first translation is that the first translation excludes the first translation word which is a translation of the first word.

In addition, the evaluation unit 12 uses sixth and seventh determination conditions, which are described below, to make determinations. The sixth and seventh determination conditions include a condition for the first text and a condition for the first translation. The condition for the first text is that the first text excludes the first word which is either the word with the first meaning or its antonym. The condition for the first translation is that the first translation includes the first translation word which is a translation of the first word.

The determination conditions for the evaluation unit 12 are not particularly limited to the examples described above. Various changes may be made. For example, a determination may be made by using a condition for the first text and a condition for the first translation. The condition for the first text is that the first text includes either or both of the word with the first meaning and its antonym. The condition for the first translation is that the first translation includes either or both of the word with the first meaning and its antonym. Alternatively, a determination may be made by using a combination of any of the first to seventh determination conditions. Alternatively, a determination may be made by using another determination condition.

On the basis of the evaluation result from the evaluation unit 12, the generating unit 22 of the translation apparatus 20 employs, for the training parallel corpus, parallel text data having no possibility of mistranslation, and does not employ, for the training parallel corpus, parallel text data having a possibility of mistranslation. Thus, the generating unit 22 generates the training parallel corpus, and stores the training parallel corpus in the training parallel-corpus storage unit 23. In the first embodiment, a possibility of mistranslation means a possibility of inducing a translation error in translation.

The method of processing parallel text data having a possibility of mistranslation is not particularly limited to the example described above. Modified parallel text data obtained by modifying the parallel text data, which has a possibility of mistranslation, so that the parallel text data does not have a possibility of mistranslation may be employed for the training parallel corpus.

For example, the generating unit 22 extracts, as parallel text data having a possibility of mistranslation, 'left'-'right' mistranslation inducing parallel texts (hereinafter referred to as "mistranslation inducing parallel texts") which induce a wrong translation in which the first-language words of 'right' and 'left' are wrongly translated into the second-language words of 'left' and 'right', respectively. The generating unit 22 determines whether it is possible for all or a part of the extracted mistranslation inducing parallel texts to be modified so that a mistranslation of 'left'-'right' antonyms is unlikely to occur, or it is not necessary for the extracted parallel texts to be modified. When the generating unit 22 determines that it is possible for the extracted mistranslation inducing parallel texts to be modified, the generating unit 22 modifies the mistranslation inducing parallel texts, generates modified parallel texts, and outputs the modified parallel texts to the training parallel-corpus storage unit 23. When the generating unit 22 determines that it is not necessary for the extracted mistranslation inducing parallel texts to be modified, the generating unit 22 outputs, to the training parallel-corpus storage unit 23, the mistranslation inducing parallel texts as texts which do not need to be modified.

The learning unit 24 learns the translation model by using the training parallel corpus stored in the training parallel-corpus storage unit 23, generates the learned translation model as a machine learning model for translation, and stores the generated machine learning model in the translation-model storage unit 25.

The form of the machine learning model is different depending on an algorithm adopted by the translation apparatus 20. For example, if the translation apparatus 20 employs a statistical machine translation technique, the machine learning model is expressed by using a translation model having learned "semantic equivalence" and a language model having learned "what is like the target language". If the translation apparatus 20 employs a neural machine translation technique, the machine learning model is described by using a sequence-to-sequence model using a recursive neural network.

Figure 2:
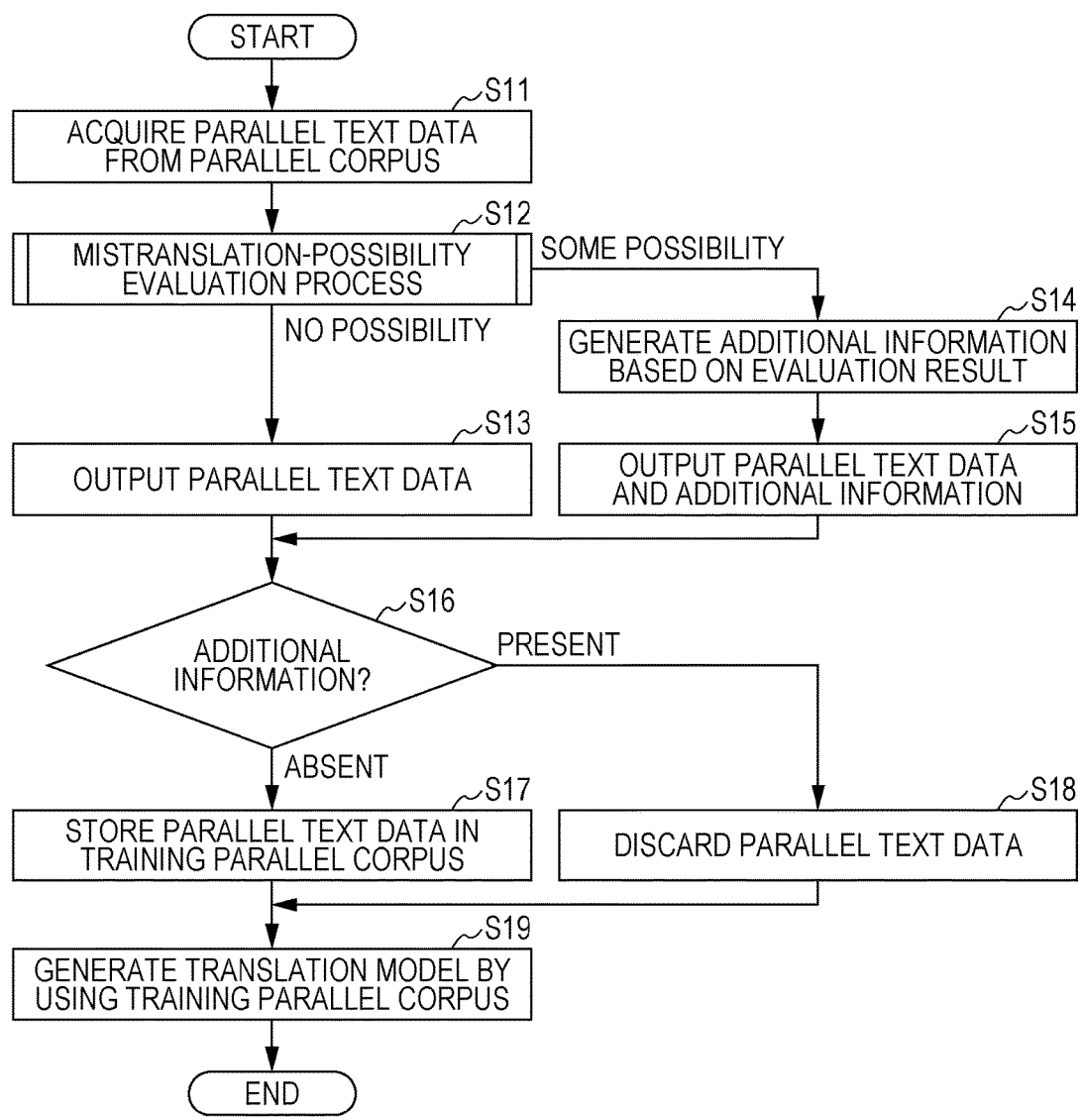
FIG. 2 is a flowchart of an exemplary translation evaluation process performed by the translation processing apparatus illustrated in FIG. 1.

The translation evaluation process performed by the translation processing apparatus 1 having the configuration as described above will be described. FIG. 2 is a flowchart of an exemplary translation evaluation process performed by the translation processing apparatus 1 illustrated in FIG. 1. In the description below, to make a more detailed description, Japanese is employed as the first language, and English is employed as the second language. However, this is merely an example. By using other languages, a possibility of mistranslation may be evaluated with a similar concept. Thus, mistranslation inducing parallel texts may be extracted, for example, for deletion. The processes which are described below and which are performed by the evaluation apparatus 10 may be performed in the configuration, for example, using the same computer as the translation apparatus 20, or some of the processes may be performed in a configuration, for example, using a different computer. Some of the steps may be performed as manual operations.

The acquisition unit 11 acquires parallel text data stored in the parallel-corpus storage unit 21, and outputs the acquired parallel text data to the evaluation unit 12 (step S11).

Then, the evaluation unit 12 performs a mistranslation-possibility evaluation process of evaluating a possibility of mistranslation in the parallel texts on the basis of the words included in the first-language text of the parallel text data and the words included in its translation (step S12). If the parallel texts have no possibility of mistranslation, the process proceeds to step S13. If the parallel texts have a possibility of mistranslation, the process proceeds to step S14.

Figure 3:
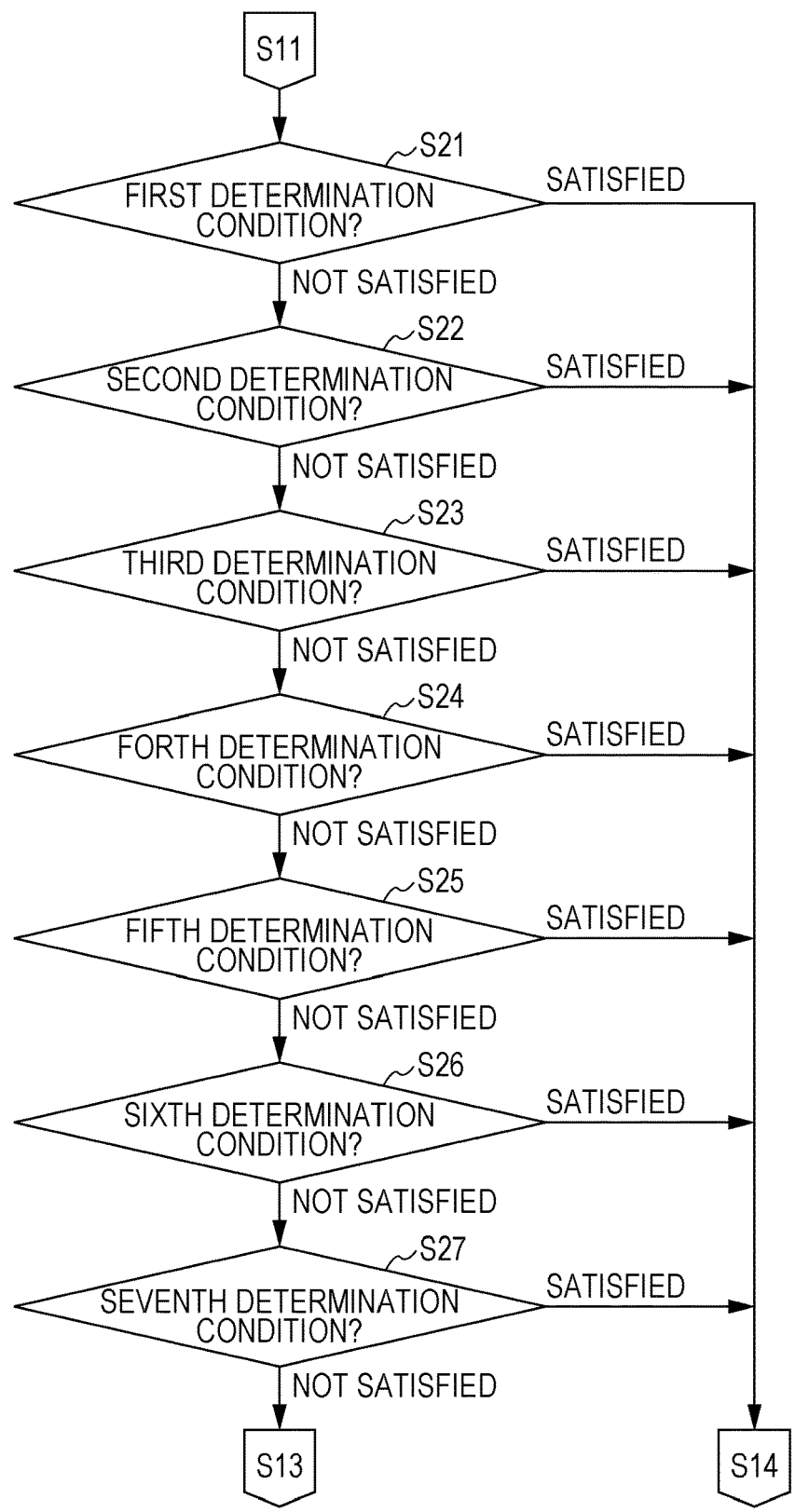
FIG. 3 is a flowchart of an exemplary mistranslation-possibility evaluation process illustrated in FIG. 2.

FIG. 3 is a flowchart of an exemplary mistranslation-possibility evaluation process (step S12) illustrated in FIG. 2. FIG. 4 is a diagram illustrating an exemplary determination table which is used to determine parallel texts inducing a 'left'-'right' mistranslation and which is used to describe concrete examples of the first to seventh determination conditions used in the mistranslation-possibility evaluation process illustrated in FIG. 3.

As illustrated in FIG. 3, the evaluation unit 12 performs, for example, a determination process (steps S21 to 27) of determining whether or not the parallel texts induce a 'left'-'right' mistranslation, as the mistranslation-possibility evaluation process (step S12) illustrated in FIG. 2. The determination process is a process of extracting mistranslation inducing parallel texts step by step through seven determination step stages according to the first to seventh determination conditions.

The evaluation unit 12 determines whether or not the parallel text data satisfies the first determination condition (step S21). If the parallel text data satisfies the first determination condition, the process proceeds to step S14 in FIG. 2. If the parallel text data does not satisfy the first determination condition, the process proceeds to step S22.

A determination table T1 in FIG. 4 for determining parallel texts inducing a 'left'-'right' mistranslation describes the first determination condition including a condition for the Japanese text and a condition for the English text. The condition for the Japanese text is that the Japanese text includes 'migi' (right) and 'hidari' (left). The condition for the English text is that the English text includes 'right' and 'left'. The determination result obtained when the parallel text data satisfies the first determination condition indicates "inducing switching between 'left' and 'right'". A recommended addressing method for the parallel text data satisfying the first determination condition is one of the following methods: a method of modifying the parallel text data so that the parallel text data includes only 'migi' (right) and 'right' or only 'hidari' (left) and 'left'; and a method of deleting the parallel text data. For example, the parallel texts, "Migi ni magaruto, hidari ni tatemono ga arimasu (Turn right, and there will be a building on the left)/Turn right, and there will be a building on the left", satisfy the first determination condition.

If the parallel text data does not satisfy the first determination condition, the evaluation unit 12 determines whether or not the parallel text data satisfies the second determination condition (step S22). If the parallel text data satisfies the second determination condition, the process proceeds to step S14 in FIG. 2. If the parallel text data does not satisfy the second determination condition, the process proceeds to step S23.

The determination table T1 in FIG. 4 describes the second determination condition including a condition for the Japanese text and a condition for the English text. The condition for the Japanese text is that the Japanese text in the parallel text data includes 'migi' (right) and excludes 'hidari' (left). The condition for the English text is that the English text excludes 'right' and includes 'left'. The determination result obtained when the parallel text data satisfies the second determination condition indicates a "mistake in parallel texts". A recommended addressing method for parallel text data satisfying the second determination condition is modification of the mistranslation in the parallel text data or deletion of the parallel text data. For example, the parallel texts, "Kaidan wo shomen ni mite, migite ni magarimasu (Looking at the stairs in front of you, turn to the right)/Looking at the stairs in front of you, turn to the left", which have an obvious parallel-text error satisfy the second determination condition.

If the parallel text data does not satisfy the second determination condition, the evaluation unit 12 determines whether or not the parallel text data satisfies the third determination condition (step S23). If the parallel text data satisfies the third determination condition, the process proceeds to step S14 in FIG. 2. If the parallel text data does not satisfy the third determination condition, the process proceeds to step S24.

The determination table T1 in FIG. 4 describes the third determination condition including a condition for the Japanese text and a condition for the English text. The condition for the Japanese text is that the Japanese text in the parallel text data excludes 'migi' (right) and includes 'hidari' (left). The condition for the English text is that the English text includes 'right' and excludes 'left'. The determination result obtained when the parallel text data satisfies the third determination condition indicates a "mistake in parallel texts". A recommended addressing method for parallel text data satisfying the third determination condition is modification of the mistranslation in the parallel text data or deletion of the parallel text data. For example, the parallel texts, "Hidari nohoni, michizoi ni hana ga uerareteimasu (Flowers are planted along the street to the left)/Flowers are planted along the street to the right", which have an obvious parallel-text error satisfy the third determination condition.

If the parallel text data does not satisfy the third determination condition, the evaluation unit 12 determines whether or not the parallel text data satisfies the fourth determination condition (step S24). If the parallel text data satisfies the fourth determination condition, the process proceeds to step S14 in FIG. 2. If the parallel text data does not satisfy the fourth determination condition, the process proceeds to step S25.

The determination table T1 in FIG. 4 describes the fourth determination condition including a condition for the Japanese text and a condition for the English text. The condition for the Japanese text is that the Japanese text in the parallel text data includes 'migi' (right). The condition for the English text is that the English text excludes 'right'. At that time, no determination is made as to presence of 'hidari' (left) in the Japanese text and presence of 'left' in the English text. The determination result obtained when the parallel text data satisfies the fourth determination condition indicates a "free translation", an "idiom", or a "mistake in parallel texts". A recommended addressing method for parallel text data satisfying the fourth determination condition is a method in which the parallel text data is individually checked and in which inappropriate parallel text data is modified or deleted.

For example, the parallel texts, "Migi ni magaruto, hidari ni tatemono ga arimasu (Turn right, and there will be a building on the left)/Turn left, and there will be a building on the left", which have an obvious parallel-text error satisfies the fourth determination condition. In addition, the parallel texts, "Migi ni mawasuto, jojo ni akarukunarimasu (If turn to the right, it gradually brightens)/If turn clockwise, it gradually brightens", also satisfies the fourth determination condition. The latter example is correct parallel texts, but is a kind of free-translation expression.

If the parallel text data does not satisfy the fourth determination condition, the evaluation unit 12 determines whether or not the parallel text data satisfies the fifth determination condition (step S25). If the parallel text data satisfies the fifth determination condition, the process proceeds to step S14 in FIG. 2. If the parallel text data does not satisfy the fifth determination condition, the process proceeds to step S26.

The determination table T1 in FIG. 4 describes the fifth determination condition including a condition for the Japanese text and a condition for the English text. The condition for the Japanese text is that the Japanese text in the parallel text data includes 'hidari' (left). The condition for the English text is that the English text excludes 'left'. At that time, no determination is made as to presence of 'migi' (right) in the Japanese text and presence of 'right' in the English text. The determination result obtained when the parallel text data satisfies the fifth determination condition indicates a "free translation", an "idiom", or a "mistake in parallel texts". A recommended addressing method for parallel text data satisfying the fifth determination condition is a method in which the parallel text data is individually checked and in which inappropriate parallel text data is modified or deleted.

For example, the parallel texts, "Hidari ni magaruto, migi ni tatemono ga arimasu (Turn left, and there will be a building on the right)/Turn right, and there will be a building on the right", which have an obvious parallel-text error satisfy the fifth determination condition. In addition, the parallel texts, "Hidari ni mawasuto, jojo ni kurakunarimasu (If turn to the left, it gradually darkens)/If turn counterclockwise, it gradually darkens", also satisfies the fifth determination condition. The latter example is correct parallel texts, but is a kind of free-translation expression.

If the parallel text data does not satisfy the fifth determination condition, the evaluation unit 12 determines whether or not the parallel text data satisfies the sixth determination condition (step S26). If the parallel text data satisfies the sixth determination condition, the process proceeds to step S14 in FIG. 2. If the parallel text data does not satisfy the sixth determination condition, the process proceeds to step S27.

The determination table T1 in FIG. 4 describes the sixth determination condition including a condition for the Japanese text and a condition for the English text. The condition for the Japanese text is that the Japanese text in the parallel text data excludes 'migi' (right). The condition for the English text is that the English text includes 'right'. At that time, no determination is made as to presence of 'hidari' (left) in the Japanese text and presence of 'left' in the English text. The determination result obtained when the parallel text data satisfies the sixth determination condition indicates polysemy of 'right' or a "mistake in parallel texts". A recommended addressing method for parallel text data satisfying the sixth determination condition is one of the following methods: a method in which the parallel text data is individually checked and in which inappropriate parallel text data is modified or deleted; and a method in which parallel text data which fails to be determined as being inappropriate is used as it is.

For example, the parallel texts, "Kono atari de magattekudasai (Make a turn around here)/Turn right around here", which have a parallel-text error satisfy the sixth determination condition. In addition, the parallel texts, "Sugu junbi shimasu (I can prepare them right away)/I can prepare them right away", also satisfy the sixth determination condition. The latter example uses 'right' with a meaning other than 'migi' (right) (polysemy of 'right'), and is a correct expression as parallel texts.

If the parallel text data does not satisfy the sixth determination condition, the evaluation unit 12 determines whether or not the parallel text data satisfies the seventh determination condition (step S27). If the parallel text data satisfies the seventh determination condition, the process proceeds to step S14 in FIG. 2. If the parallel text data does not satisfy the seventh determination condition, the process proceeds to step S13 in FIG. 2.

The determination table T1 in FIG. 4 describes the seventh determination condition including a condition for the Japanese text and a condition for the English text. The condition for the Japanese text is that the Japanese text in the parallel text data excludes 'hidari' (left). The condition for the English text is that the English text includes 'left'. At that time, no determination is made as to presence of 'migi' (right) in the Japanese text and presence of 'right' in the English text. The determination result obtained when the parallel text data satisfies the seventh determination condition indicates polysemy of 'left' or a "mistake in parallel texts". A recommended addressing method for parallel text data satisfying the seventh determination condition is one of the following methods: a method in which the parallel text data is individually checked and in which inappropriate parallel text data is modified or deleted; and a method in which parallel text data which fails to be determined as being inappropriate is used as it is.

For example, the parallel texts, "Kono atari de magattekudasai (Make a turn around here)/Turn left around here", which have a parallel-text error satisfy the seventh determination condition. In addition, the parallel texts, "Heya ni kagi wo okiwasuremashita (I left my key in the room)/I left my key in the room", also satisfy the seventh determination condition. The latter example uses 'left' with a meaning other than 'hidari' (left) (polysemy of 'left'), and is a correct expression as parallel texts.

Referring to FIG. 2 again, if the parallel texts have no possibility of mistranslation, that is, if the parallel texts do not satisfy any of the first to seventh determination conditions, the evaluation unit 12 outputs, along with the parallel text data to the output unit 13, an evaluation result indicating that the parallel texts do not satisfy any of the first to seventh determination conditions. The output unit 13 outputs the parallel text data to the generating unit 22 (step S13). Then, the process proceeds to step S16.

In contrast, if the parallel texts have a possibility of mistranslation, that is, if the parallel texts satisfy one of the first to seventh determination conditions, the evaluation unit 12 outputs, along with the parallel text data to the output unit 13, an evaluation result indicating the number of the determination condition satisfied by the parallel texts. The output unit 13 generates additional information indicating the number of the determination condition satisfied by the parallel texts (step S14).

The output unit 13 adds, as accompanying information of the parallel texts, the number (one of 1 to 7) of the satisfied determination condition to the parallel texts satisfying the corresponding one of the first to seventh determination conditions. The output unit 13 outputs the parallel text data and the additional information to the generating unit 22 (step S15). Then, the process proceeds to step S16.

The generating unit 22 determines whether or not the parallel text data obtained from the output unit 13 has additional information (step S16). If additional information is not present, the process proceeds to step S17. If additional information is present, the process proceeds to step S18.

If additional information is not present, the generating unit 22 stores the parallel text data in the training parallel-corpus storage unit 23 (step S17). In contrast, if additional information is present, the generating unit 22 discards the parallel text data, and does not store the parallel text data in the training parallel-corpus storage unit 23 (step S18).

The learning unit 24 generates a translation model by using the training parallel corpus stored in the training parallel-corpus storage unit 23, and stores the translation model in the translation-model storage unit 25 (step S19).

Through the processes described above, in the first embodiment, parallel text data which is a pair of a text described in the first language and a translation in the second language is acquired from the parallel-corpus storage unit 21. On the basis of a determination result indicating which condition among the first to seventh determination conditions is satisfied by the parallel text data, it is evaluated whether or not the parallel text data has a possibility of mistranslation. Thus, parallel texts which are highly likely to induce a translation error in translation may be extracted easily and appropriately.

In addition, on the basis of the evaluation result, parallel text data having no possibility of mistranslation is employed for the training parallel corpus. Parallel text data having a possibility of mistranslation is not employed for the training parallel corpus. Thus, the training parallel corpus is generated. Therefore, the training parallel corpus which excludes parallel texts which are likely to induce a translation error in translation may be generated.

Further, the translation model is learned by using the training parallel corpus which excludes parallel text data which is likely to induce a translation error in translation. Therefore, occurrence of mistranslations, such as mistranslations of 'left'-'right' antonyms, in a translation result obtained by using the translation model may be suppressed.

Therefore, the learning unit 24 may perform machine learning by using the high-quality training parallel corpus which is stored in the training parallel-corpus storage unit 23 and which excludes mistranslation inducing parallel texts. The translation apparatus 20 uses the resulting machine learning model stored in the translation-model storage unit 25, suppressing occurrence of mistranslations of 'left'-'right' antonyms.

As a result, since occurrence of mistranslations, such as mistranslations of 'left'-'right' antonyms, in the translation apparatus 20 may be suppressed, the translation processing apparatus 1 according to the first embodiment is useful in providing an automatic translation service, for example, for route guidance use or operation instruction use for which, for example, a 'left'-'right' mistranslation is fatal.

In the first embodiment, the generating unit 22 functions as a unit which extracts, for deletion, parallel texts which induce a 'left'-'right' mistranslation. When parallel text data which satisfies one of the first to seventh determination conditions is extracted, the parallel text data is deleted and discarded. However, this example is not particularly limiting. The generating unit 22 may also function as a unit modifying texts which induce a 'left'-'right' mistranslation. The generating unit 22 may modify parallel text data satisfying one of the first to seventh determination conditions, and may store the modified parallel text data in the training parallel-corpus storage unit 23.

In this case, according to the added determination condition number (any of one to seven), the generating unit 22 modifies the parallel text data ('left'-'right' mistranslation inducing parallel texts) which satisfies any of the first to seventh determination conditions and which may be modified, according to a corresponding recommended addressing method described in the determination table T1 in FIG. 4. At that time, the modification is made so that the modified parallel text data does not newly satisfy a different one of the first to seventh determination conditions.

Specific modification methods will be described by taking, as examples, parallel texts satisfying the first to seventh determination conditions.

For example, in the case where parallel texts satisfying the first determination condition are "Migi ni magaruto, hidari ni tatemono ga arimasu (Turn right, and there will be a building on the left)/Turn right, and there will be a building on the left", the generating unit 22 modifies the parallel texts so that the parallel texts includes only 'migi' (right) and 'right' or only 'hidari' (left) and 'left'. That is, the modified parallel texts are "Migi ni magaruto, migi ni tatemono ga arimasu (Turn right, and there will be a building on the right)/Turn right, and there will be a building on the right" or "Hidari ni magaruto, hidari ni tatemono ga arimasu (Turn left, and there will be a building on the left)/Turn left, and there will be a building on the left." This may cause learning of 'migi' (right) and 'hidari' (left) as wrong antonyms to be avoided.

In addition, for example, in the case where parallel texts satisfying the second determination condition are "Kaidan wo shomen ni mite, migite ni magarimasu (Looking at the stairs in front of you, turn to the right)/Looking at the stairs in front of you, turn to the left", the generating unit 22 modifies the parallel-text error. That is, the modified parallel texts are "Kaidan wo shomen ni mite, migite ni magarimasu (Looking at the stairs in front of you, turn to the right)/Looking at the stairs in front of you, turn to the right." This may cause learning of 'migi' (right) and 'hidari' (left) as wrong antonyms to be avoided.

In addition, for example, in the case where parallel texts satisfying the third determination condition are "Hidari no honi, michizoi ni hana ga uerareteimasu (Flowers are planted along the street to the left)/Flowers are planted along the street to the right", the generating unit 22 modifies the parallel-text error. That is, the modified parallel texts are "Hidari no honi, michizoi ni hana ga uerareteimasu (Flowers are planted along the street to the left)/Flowers are planted along the street to the left". This may cause learning of 'migi' (right) and 'hidari' (left) as wrong antonyms to be avoided.

In addition, for example, in the case where a first example of parallel texts satisfying the fourth determination condition is "Migi ni magaruto, hidari ni tatemono ga arimasu (Turn right, and there will be a building on the left)/Turn left, and there will be a building on the left", the parallel-text error may be modified. However, if the English text is modified, the modified parallel texts satisfy the first determination condition. In this case, the generating unit 22 modifies the Japanese text, and the modified parallel texts are "Hidari ni maraguto, hidari ni tatemono ga arimasu (Turn left, and there will be a building on the left)/Turn left, and there will be a building on the left." This may cause learning of 'migi' (right) and 'hidari' (left) as wrong antonyms to be avoided.

In addition, in the case where a second example of parallel texts satisfying the fourth determination condition is "Migi ni mawasuto, jojo ni akarukunarimasu (If turn to the right, it gradually brightens)/If turn clockwise, it gradually brightens", the generating unit 22 modifies the free-translation expression. The modified parallel texts are "Migi ni mawasuto, jojo ni akarukunarimasu (If turn to the right, it gradually brightens)/If turn to the right, it gradually brightens", or the Japanese text is modified so that the modified parallel texts are "Tokeimawari ni mawasuto, jojo ni akarukunarimasu (If turn clockwise, it gradually brightens)/If turn clockwise, it gradually brightens". This may cause learning of 'migi' (right) and 'hidari' (left) as wrong antonyms to be avoided.

In addition, for example, in the case where a first example of parallel texts satisfying the fifth determination condition is "Hidari ni magaruto, migi ni tatemono ga arimasu (Turn left, and there will be a building on the right)/Turn right, and there will be a building on the right", the parallel-text error may be modified. However, if the English text is modified, the modified parallel texts satisfy the first determination condition. In this case, the generating unit 22 modifies the Japanese text so that the modified parallel texts are "Migi ni magaruto, migi ni tatemono ga arimasu (Turn right, and there will be a building on the right)/Turn right, and there will be a building on the right". This may cause learning of 'migi' (right) and 'hidari' (left) as wrong antonyms to be avoided.

In addition, in the case where a second example of parallel texts satisfying the fifth determination condition is "Hidari ni mawasuto, jojo ni kurakunarimasu (If turn to the left, it gradually darkens)/If turn counterclockwise, it gradually darkens", the generating unit 22 modifies the free-translation expression. The modified parallel texts are "Hidari ni mawasuto, jojo ni kurakunarimasu (If turn to the left, it gradually darkens)/If turn to the left, it gradually darkens", or the Japanese text is modified so that the modified parallel texts are "Hantokeimawari ni mawasuto, jojo ni kurakunarimasu (If turn counterclockwise, it gradually darkens)/If turn counterclockwise, it gradually darkens". This may cause learning of 'migi' (right) and 'hidari' (left) as wrong antonyms to be avoided.

In addition, for example, in the case where a first example of parallel texts satisfying the sixth determination condition is "Konoatari de magattekudasai (Turn around here)/Turn right around here", the generating unit 22 modifies the parallel-text error. That is, 'right' is deleted from the English text so that the modified parallel texts are "Konoatari de magattekudasai (Turn around here)/Turn around here". In contrast, in the case where a second example of parallel texts satisfying the sixth determination condition is "Sugu junbi shimasu (I can prepare them right away)/I can prepare them right away", the parallel texts are correct. Modification is basically unnecessary.

In addition, for example, in the case where a first example of parallel texts satisfying the seventh determination condition is "Konoatari de magattekudasai (Turn around here)/Turn left around here", the generating unit 22 modifies the parallel-text error. That is, 'left' is deleted from the English text, and the modified parallel texts are "Konoatari de magattekudasai (Turn around here)/Turn around here". In contrast, in the case where a second example of parallel texts satisfying the seventh determination condition is "Heya ni kagi wo okiwasuremashita (I left my key in the room)/I left my key in the room", the parallel texts are correct. Modification is basically unnecessary.

In these processes of modifying parallel texts, if it is not possible to modify the parallel texts, or if the modified result is the same as other modified parallel texts, the parallel texts may be discarded at that time point.

As in the examples described above, modified parallel texts (modified parallel text data) generated by modifying mistranslation inducing parallel texts are output from the generating unit 22 to the training parallel-corpus storage unit 23, and are added to the training parallel corpus received by the learning unit 24. In addition, parallel texts for which the generating unit 22 determines that it is not necessary to be modified (texts that do not need to be modified) are output, without modification, to the training parallel-corpus storage unit 23, and are added to the training parallel corpus similarly to the modified parallel text.

As described above, on the basis of the evaluation result, parallel text data which has no possibility of mistranslation is employed for the training parallel corpus. Modified parallel text data obtained by modifying parallel text data having a possibility of mistranslation so that the parallel text data has no possibility of mistranslation is employed for the training parallel corpus. Thus, the training parallel corpus is generated. Therefore, the training parallel corpus which has a large number of data pieces and which excludes parallel texts that are likely to induce a translation error in translation may be generated.

Second Embodiment

Figure 5:
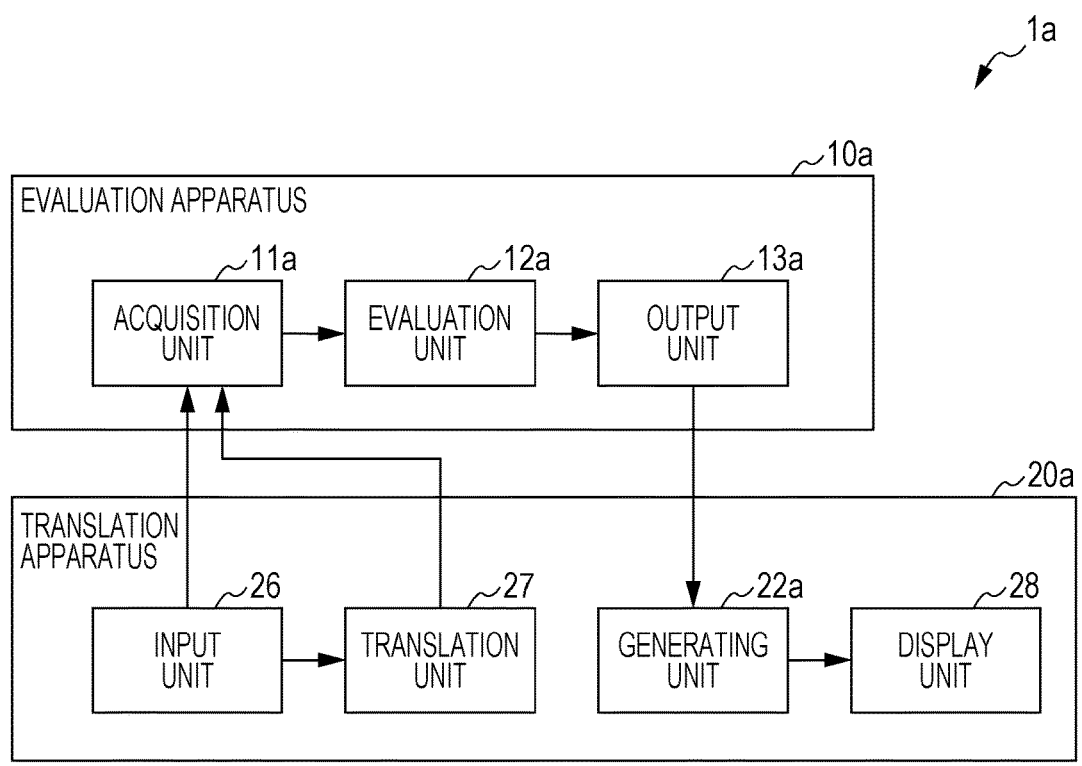
FIG. 5 is a block diagram illustrating an exemplary configuration of a translation processing apparatus according to a second embodiment of the present disclosure.

FIG. 5 is a block diagram illustrating an exemplary configuration of a translation processing apparatus according a second embodiment of the present disclosure. A translation processing apparatus 1*a* illustrated in FIG. 5 includes an evaluation apparatus 10*a* and a translation apparatus 20*a*. The evaluation apparatus 10*a* includes an acquisition unit 11*a*, an evaluation unit 12*a*, and an output unit 13*a*. The translation apparatus 20*a* includes a generating unit 22*a*, an input unit 26, a translation unit 27, and a display unit 28.

The translation processing apparatus 1*a* illustrated in FIG. 5 processes parallel text data (parallel texts) including an input text described in the first language and a translation of the input text into the second language. Also in the second embodiment, similarly to the first embodiment, Japanese is employed as the first language, and English is employed as the second language. However, this is merely an example.

In the translation processing apparatus 1*a*, parallel text data is acquired from the translation apparatus 20*a* which translates the input text described in the first language into a translation in the second language. The evaluation apparatus 10*a* evaluates a possibility that the translation result includes a translation error. On the basis of the evaluation result, information about a possibility that the translation result includes a translation error is presented to a user. The evaluation apparatus 10*a* evaluates a possibility that the translation result from the translation apparatus 20*a* includes a translation error. The translation apparatus 20*a* performs translation by using the translation model, and generates, for display, alert information or the like on the basis of the evaluation result from the evaluation apparatus 10*a*.

The translation processing apparatus 1*a* is, for example, formed of one or more computers including a CPU, a ROM, a RAM, and an auxiliary storage device. The translation apparatus 20*a* of the translation processing apparatus 1*a* may be configured as a translation apparatus separate from the evaluation apparatus 10*a*. The translation apparatus 20*a* may be, for example, formed of a personal digital assistant, such as a smartphone or a tablet terminal, or may be formed of a desktop computer. Alternatively, the translation apparatus 20*a* may be formed of a cloud server. In this case, for example, the input unit 26 which receives an input text and the like and the display unit 28 which displays a translation and the like may be formed of a personal digital assistant carried by a user or a desktop computer. The components other than these may be formed of a cloud server.

The input unit 26 of the translation apparatus 20*a* is formed, for example, of an input device such as a touch panel, an input device such as a keyboard and mouse, or a text input device using voice. The input unit 26 receives an input text described in the first language through user operations, and outputs the input text to the translation unit 27 and the acquisition unit 11*a* of the evaluation apparatus 10*a*.

The translation unit 27 translates the input text and outputs the translation in the second language to the acquisition unit 11*a* of the evaluation apparatus 10*a*. The translation unit 27 may perform the above-described translation operation, for example, by using the translation model generated in the first embodiment. In this case, in addition to suppression of occurrence itself of mistranslations of 'left'-

'right' antonyms according to the first embodiment, attention to a possibility of mistranslation of 'left'-'right' antonyms in the translation result may be further called. Therefore, the second embodiment is more preferable. The translation unit 27 may be implemented, for example, by executing programs that cause a computer including a CPU to function as a translation apparatus, or may be implemented by using dedicated hardware circuits.

The acquisition unit 11*a* of the evaluation apparatus 10*a* acquires, from the translation apparatus 20*a*, the input text and the translation as parallel text data, and outputs the input text and the translation to the evaluation unit 12*a*. The evaluation unit 12*a* evaluates whether or not the parallel text data has a possibility of mistranslation on the basis of the words included in the input text and the translation of the parallel text data. The evaluation unit 12*a* outputs the evaluation result along with the parallel text data to the output unit 13*a*. As information based on the evaluation result, the output unit 13*a* outputs, to the generating unit 22*a* of the translation apparatus 20*a*, the mistranslation-possibility evaluation result for each parallel text data.

The parallel text data acquired by the acquisition unit 11*a* is not particularly limited to the parallel text data generated by using the translation model according to the first embodiment. As long as the translation apparatus outputs a translation result with an input text, parallel text data from any translation apparatus may be used. In this case, as the host process of any translation apparatus, the evaluation apparatus 10*a* is arranged. Even in the state in which only an existing translation apparatus which is not capable of generating a machine learning model using any parallel corpus is used, attention to a possibility of mistranslation of 'left'-'right' antonyms in the translation result may be called, enabling a user of the translation apparatus to obtain correct translations.

Specifically, the evaluation unit 12*a* uses the first determination condition, which is described below, to make a determination. The first determination condition includes a condition for the input text and a condition for the translation. The condition for the input text is that the input text includes both a word with a first meaning and its antonym. The condition for the translation is that the translation includes both a word with the first meaning and its antonym.

The evaluation unit 12*a* uses the second and third determination conditions, which are described below, to make determinations. The second and third determination conditions include a condition for the input text and a condition for the translation. The condition for the input text is that the input text includes a first word which is either the word with the first meaning or its antonym and excludes the other second word. The condition for the translation is that the translation excludes the first translation word which is a translation of the first word and includes the second translation word which is a translation of the second word.

The evaluation unit 12*a* uses the fourth and fifth determination conditions, which are described below, to make determinations. The fourth and fifth determination conditions include a condition for the input text and a condition for the translation. The condition for the input text is that the input text includes the first word which is either the word with the first meaning or its antonym. The conditions for the translation is that the translation excludes the first translation word which is a translation of the first word.

A determination made by the evaluation unit 12*a* is not particularly limited to the examples described above. Various changes may be made. For example, a determination may be made by using a condition for the input text and a condition for the translation. The condition for the input text is that the input text includes either or both of the word with the first meaning and its antonym. The condition for the translation is that the translation includes either or both of the word with the first meaning and its antonym. Alternatively, a determination may be made by using a combination of any of the first to fifth determination conditions. Alternatively, a determination may be made by using another determination condition. Further, similarly to the sixth and seventh determination conditions in the first embodiment, a determination may be made by using a condition for the input text and a condition for the translation. The condition for the input text is that the input text excludes the first word which is either the word with the first meaning or its antonym. The condition for the translation is that the translation includes the first translation word which is a translation of the first word.

The generating unit 22*a* of the translation apparatus 20*a* determines a possibility of mistranslation, such as a possibility of 'left'-'right' mistranslation, included in the translation result on the basis of the evaluation result from the evaluation unit 12*a*. The generating unit 22*a* generates alert information according to the determination result, and outputs the alert information to the display unit 28. Specifically, the generating unit 22*a* generates, as alert information, first alert information indicating a first possibility as a possibility of mistranslation and second alert information indicating, as a possibility of mistranslation, a second possibility higher than the first possibility. In addition, the generating unit 22*a* generates a reference translation example in addition to the alert information. In the second embodiment, a possibility of mistranslation means a possibility that a translation result includes a translation error.

The display unit 28 which includes, for example, a display device displays the information generated by the generating unit 22*a*, for example, the alert information and the reference translation example, and alerts a user about a possibility of mistranslation. The configuration of the display unit 28 is not particularly limited to the example described above. The display unit 28 may include other output equipment such as a speaker.

Figure 6:
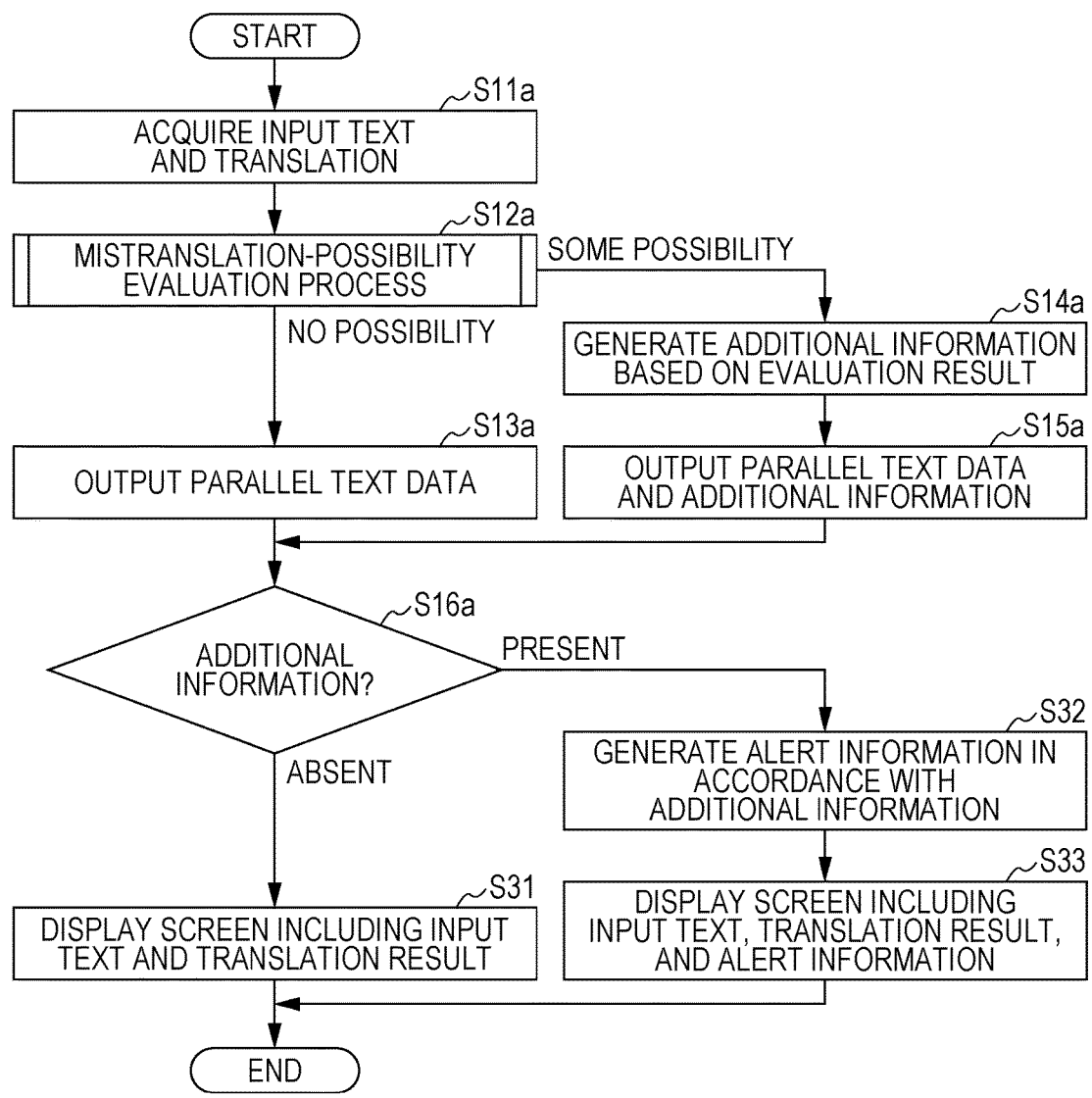
FIG. 6 is a flowchart of an exemplary translation evaluation process performed by the translation processing apparatus illustrated in FIG. 5.

The translation evaluation process performed by the translation processing apparatus 1*a* having the configuration described above will be described. FIG. 6 is a flowchart of an exemplary translation evaluation process performed by the translation processing apparatus 1*a* illustrated in FIG. 5. In the description below, to make a more detailed description, Japanese is employed as the first language, and English is employed as the second language. However, this is merely an example. By using other languages, a possibility of mistranslation may be evaluated with a similar concept. Thus, the alert information and the reference translation example may be displayed to alert a user about a possibility of mistranslation. The processes which are performed by the evaluation apparatus 10*a* and which are described below may be performed in the configuration, for example, using the same computer as the translation apparatus 20*a*, or some of the processes may be performed in a configuration, for example, using a different computer. Some of the steps may be performed as manual operations.

The acquisition unit 11*a* acquires an input text and a translation as parallel text data from the translation apparatus 20*a*, and outputs the input text and the translation to the evaluation unit 12*a* (step S11*a*).

The evaluation unit 12*a* performs a mistranslation-possibility evaluation process of evaluating a possibility of mistranslation of the parallel texts on the basis of the words included in the input text and the translation of the parallel text data (step S12a). If the parallel text data has no possibility of mistranslation, the process proceeds to step S13a. If the parallel text data has a possibility of mistranslation, the process proceeds to step S14a.

FIG. 7 is a flowchart of an exemplary mistranslation-possibility evaluation process (step S12a) illustrated in FIG. 6. First to fifth determination conditions used in the mistranslation-possibility evaluation process in FIG. 6 are similar to the first to fifth determination conditions in the determination table T1 illustrated in FIG. 4, except the recommended addressing methods. A description will be made by appropriately using the first to fifth determination conditions illustrated in FIG. 4.

As illustrated in FIG. 7, the evaluation unit 12a performs, for example, a determination process (steps S21a to 25a) of determining whether or not the parallel texts induce a 'left'-'right' mistranslation, as the mistranslation-possibility evaluation process (step S12a) illustrated in FIG. 6. The determination process is a process of extracting mistranslation inducing parallel texts step by step through five determination step stages according to the first to fifth determination conditions. Alert information according to the determination result is generated.

The first to fifth determination conditions applied for the Japanese text and the English text are the same as the first to fifth determination conditions in the above-described determination table T1 illustrated in FIG. 4. In the second embodiment, the sixth and seventh determination conditions illustrated in FIG. 4 are not used in the determination process performed by the evaluation unit 12a. However, these conditions may be added to the configuration.

The evaluation unit 12a determines whether or not the parallel text data satisfies the first determination condition (step S21a). If the parallel text data satisfies the first determination condition, the process proceeds to step S14a in FIG. 6. If the parallel text data does not satisfy the first determination condition, the process proceeds to step S22a.

As illustrated in the determination table T1 in FIG. 4, the first determination condition includes a condition for the Japanese text and a condition for the English text. The condition for the Japanese text is that the Japanese text includes 'migi' (right) and 'hidari' (left). The condition for the English text is that the English text includes 'right' and 'left'. The determination result obtained when the parallel text data satisfies the first determination condition indicates "inducing switching between 'left' and 'right'". For example, the parallel texts, "Migi ni magaruto, hidari ni tatemono ga arimasu (Turn right, and there will be a building on the left)/Turn right, and there will be a building on the left", satisfy the first determination condition.

If the parallel text data does not satisfy the first determination condition, the evaluation unit 12a determines whether or not the parallel text data satisfies the second determination condition (step S22a). If the parallel text data satisfies the second determination condition, the process proceeds to step S14a in FIG. 6. If the parallel text data does not satisfy the second determination condition, the process proceeds to step S23a.

As illustrated in the determination table T1 in FIG. 4, the second determination condition includes a condition for the Japanese text and a condition for the English text. The condition for the Japanese text is that the Japanese text of the parallel text data includes 'migi' (right) and excludes 'hidari' (left). The condition for the English text is that the English text excludes 'right' and includes 'left'. The determination result obtained when the parallel text data satisfies the second determination condition indicates a "mistake in parallel texts". For example, the parallel texts, "Kaidan wo shomen ni mite, migite ni magarimasu (Looking at the stairs in front of you, turn to the right)/Looking at the stairs in front of you, turn to the left", which have an obvious parallel-text error satisfy the second determination condition.

If the parallel text data does not satisfy the second determination condition, the evaluation unit 12a determines whether or not the parallel text data satisfies the third determination condition (step S23a). If the parallel text data satisfies the third determination condition, the process proceeds to step S14a in FIG. 6. If the parallel text data does not satisfy the third determination condition, the process proceeds to step S24a.

As illustrated in the determination table T1 in FIG. 4, the third determination condition includes a condition for the Japanese text and a condition for the English text. The condition for the Japanese text is that the Japanese text of the parallel text data excludes 'migi' (right) and includes 'hidari' (left). The condition for the English text is that the English text includes 'right' and excludes 'left'. The determination result obtained when the parallel text data satisfies the third determination condition indicates a "mistake in parallel texts". For example, the parallel texts, "Hidari no honi, michizoi ni hana ga uerareteimasu (Flowers are planted along the street to the left)/Flowers are planted along the street to the right", which have an obvious parallel-text error satisfy the third determination condition.

If the parallel text data does not satisfy the third determination condition, the evaluation unit 12a determines whether or not the parallel text data satisfies the fourth determination condition (step S24a). If the parallel text data satisfies the fourth determination condition, the process proceeds to step S14a in FIG. 6. If the parallel text data does not satisfy the fourth determination condition, the process proceeds to step S25a.

As illustrated in the determination table T1 in FIG. 4, the fourth determination condition includes a condition for the Japanese text and a condition for the English text. The condition for the Japanese text is that the Japanese text of the parallel text data includes 'migi' (right). The condition for the English text is that the English text excludes 'right'. At that time, no determination is made as to presence of 'hidari' (left) in the Japanese text and presence of 'left' in the English text. The determination result obtained when the parallel text data satisfies the fourth determination condition indicates a "free translation", an "idiom", or a "mistake in parallel texts". For example, the parallel texts, "Migi ni magaruto, hidari ni tatemono ga arimasu (Turn right, and there will be a building on the left)/Turn left, and there will be a building on the left", which have an obvious parallel-text error satisfy the fourth determination condition. In addition, the parallel texts, "Migi ni mawasuto, jojo ni akarukunarimasu (If turn to the right, it gradually brightens)/If turn clockwise, it gradually brightens", also satisfy the fourth determination condition. The latter example is correct parallel texts but is a kind of free-translation expression.

If the parallel text data does not satisfy the fourth determination condition, the evaluation unit 12a determines whether or not the parallel text data satisfies the fifth determination condition (step S25a). If the parallel text data satisfies the fifth determination condition, the process proceeds to step S14a in FIG. 6. If the parallel text data does not satisfy the fifth determination condition, the process proceeds step S13a in FIG. 6.

As illustrated in the determination table T1 in FIG. 4, the fifth determination condition includes a condition for the Japanese text and a condition for the English text. The condition for the Japanese text is that the Japanese text of the parallel text data includes 'hidari' (left). The condition for the English text is that the English text excludes 'left'. At that time, no determination is made as to presence of 'migi' (right) in the Japanese text and presence of 'right' in the English text. The determination result obtained when the parallel text data satisfies the fifth determination condition indicates a "free translation", an "idiom", or a "mistake in parallel texts". For example, the parallel texts, "Hidari ni magaruto, migi ni tatemono ga arimasu (Turn left, and there will be a building on the right)/Turn right, and there will be a building on the right", which have an obvious parallel-text error satisfy the fifth determination condition. In addition, the parallel texts, "Hidari ni mawasuto, jojo ni kurakunarimasu (If turn to the left, it gradually darkens)/If turn counterclockwise, it gradually darkens", also satisfy the fifth determination condition. The latter example is correct parallel texts, but is a kind of free-translation expression.

Referring to FIG. 6 again, if the parallel text data has no possibility of mistranslation, that is, if the parallel texts do not satisfy any of the first to fifth determination conditions, the evaluation unit 12a outputs, to the output unit 13a, the evaluation result indicating that the parallel texts do not satisfy any of the first to fifth determination conditions, along with the parallel text data. The output unit 13a outputs the parallel text data to the generating unit 22a (step S13a). Then, the process proceeds to step S16a.

In contrast, if the parallel text data has a possibility of mistranslation, that is, if the parallel texts satisfy one of the first to fifth determination conditions, the evaluation unit 12a outputs, to the output unit 13a, the evaluation result indicating the number of the determination condition satisfied by the parallel texts, along with the parallel text data. The output unit 13a generates additional information indicating the number of the determination condition satisfied by the parallel texts (step S14a).

The output unit 13a adds, as accompanying information of the parallel texts, the number (one of 1 to 5) of the satisfied determination condition to the parallel texts satisfying the corresponding one of the first to fifth determination conditions. The output unit 13a outputs the parallel text data and the additional information to the generating unit 22a (step S15a). Then, the process proceeds to step S16a.

The generating unit 22a determines whether or not the parallel text data obtained from the output unit 13a has additional information (step S16a). If the parallel text data does not have additional information, the process proceeds to step S31. If the parallel text data has additional information, the process proceeds to step S32.

If the parallel text data does not have additional information, the generating unit 22a generates image information including the input text and the translation from the parallel text data, and outputs the image information to the display unit 28. The display unit 28 displays a screen including the input text and the translation result (translation) (step S31). Then, the process ends.

In contrast, if the parallel text data has additional information, that is, if the input text in Japanese and the translation in English satisfy one of the first to fifth determination conditions, the generating unit 22a generates alert information according to the additional information (step S32).

Specifically, in the case where the Japanese input text and the English translation satisfy the first determination condition, the generating unit 22a determines the risk level of a possibility of mistranslation to be "1". The generating unit 22a generates, for notification to a user, alert information such as "In some rare cases, an input text including both 'left' and 'right' may cause a translation result in which 'left' and 'right', are switched between each other." and "It is recommended that an input text which does not include both 'left' and 'right' at the same time be translated."

In the case where the Japanese input text and the English translation satisfy one of the second to fifth determination conditions, the generating unit 22a determines the risk level of a possibility of mistranslation to be "2" which indicates a higher possibility. The generating unit 22a generates, for notification to a user, alert information such as "The meanings of 'left' and 'right' in the translation result may be set to the reverse meanings."

The alert information generated by the generating unit 22a is not particularly to the examples described above. For example, in the case where the Japanese input text and the English translation satisfy the sixth or seventh determination condition, the generating unit 22a may determine the risk level to be lower than the risk level "2" described above. The generating unit 22a may generate alert information such as "A possibility of mistranslation is very low. However, be cautious about the translation." In this case, the risk level given when the parallel text data satisfies one of the second to fifth determination conditions may be changed to "3", and the risk level given when the parallel text data satisfies one of the sixth and seventh determination conditions may be displayed as "2". In addition, the reference translation example described blow is not necessarily displayed.

To provide supplementary information to the alert information, the generating unit 22a generates a reference translation as the reference translation example, and outputs the reference translation to the display unit 28. The display unit 28 displays a screen including the input text, the translation result (translation), and the alert information (including the reference translation) (step S33). Then, the process ends. The process of generating and displaying a reference translation may be skipped when necessary.

Various methods may be used as the process of generating a reference translation. For example, the generating unit 22a prepares the Japanese input text and a different text similar to the Japanese input text, as a reference example text. The generating unit 22a outputs, to the display unit 28, the reference example text along with the reference translation which is the machine translation result obtained by the translation unit 27 translating the reference example text. The generating unit 22a generates a certain number of such pairs of a reference example text and a reference translation, and adds the pairs to the alert information. For the 'left'-'right' mistranslation, when the expression of the input text is changed, the changed text may be translated correctly. Therefore, presentation of translation results of multiple similar texts helps a user judge the translation results overall and attain a translation result having the correct meaning.

The generating unit 22a may generate the reference example text, for example, as a paraphrase of the Japanese input text. Specifically, the generating unit 22a divides the Japanese input text into multiple segments. By using a given paraphrasing rule, the generating unit 22a paraphrases (replaces) one or more of the segments into (with) other expressions in the first language, thereby generating multiple input paraphrases.

As a method of dividing an input text into multiple segments, for example, a method of segmenting an input text into each word is employed. As a paraphrasing rule, for example, the relationships between words which are registered, for example, in the context similarity database, the word co-occurrence frequency database, the implication relationship database, and the hypernym hierarchy database which are used for ALAGIN language resources may be used.

For example, a first word included in a segment in an input text may be paraphrased into a second word having the context similarity relationship. Alternatively, a first word included in a segment in an input text may be paraphrased into a second word having the co-occurrence relationship. Alternatively, a first word included in a segment in an input text may be paraphrased into a second word having the implication relationship. Alternatively, a first word included in a segment in an input text may be paraphrased into a second word having the hypernym/hyponym relationship. The method of dividing an input text and the paraphrasing rule are not particularly limited to the examples described above. Another method and another rule may be employed.

FIG. 8 is a diagram illustrating an exemplary alert information screen displayed by the display unit 28 of the translation processing apparatus 1a illustrated in FIG. 5. A translation result display D2 on an alert information screen D1 of the display unit 28 illustrated in FIG. 8 describes basic information displayed in the translation evaluation process when the parallel text data satisfies the second determination condition. In addition to the translation result display D2, a reference translation result display D3 is also displayed.

On the translation result display D2, "Migite ni aru okimono wo sugiruto, iriguchi ga gozaimasu" (Pass the ornament on the right hand side there is the entrance) is displayed as an input text. As the translation result, "Pass the ornament on the left hand side there is the entrance" is displayed. As alert information, "Risk level: 2 [A mistranslation may occur]", "The meanings of 'left' and 'right' in the translation result may be set to the reverse meanings", and "Check the translation also with reference to the reference translation examples." are displayed. In addition, 'left' displayed with a highlight is a portion in which a mistranslation may occur in the translation result. On the translation result display D2, portions corresponding to the meanings of 'left' and 'right' in the input text and the translation result may be displayed with a highlight, such as a bold character, an underline, a character-color change, or a combination of these.

On the reference translation result display D3, "Migi ni aru okimono no mae wo tootteikuto, iriguchi ga gozaimasu" (If you pass through the ornament on the right side, there is the entrance) is displayed as the first reference example text, and "If you pass through the ornament on the right side there is the entrance." is displayed as the first reference translation. In addition, "Migi no okimono wo torisugimasu. Iriguchi ga gozaimasu." (Pass the ornament on the right. There is the entrance.) is displayed as the second reference example text, and "Pass the ornament on the right. There is the entrance." is displayed as the second reference translation. On the reference translation result display D3, portions corresponding to the meanings of 'left' and 'right' in the reference example texts and the reference translations may be displayed with a highlight, such as a bold character, an underline, a character-color change, or a combination of these.

Through the above-described processes, in the second embodiment, parallel text data which is a pair of an input text described in the first language and a translation of the input text into the second language is obtained from the translation apparatus 20a. On the basis of the determination result indicating which condition among the first to fifth determination conditions is satisfied by the parallel text data, it is evaluated whether or not the parallel text data has a possibility of mistranslation. On the basis of the evaluation result, alert information is generated and displayed. Thus, a user may overall determine whether or not the translation result includes a translation error such as a 'left'-'right' mistranslation. A user's easy acceptance of a mistranslation such as a 'left'-'right' mistranslation may be avoided.

In addition, first alert information (risk level 1) indicating a first possibility as a possibility of mistranslation and second alert information (risk level 2) indicating, as a possibility of mistranslation, a second possibility which is higher than the first possibility are generated as alert information. Therefore, a possibility of mistranslation such as a possibility of 'left'-'right' mistranslation in the translation result from the translation unit 27 may be displayed as stage (risk level) information. Accordingly, a user may determine whether or not the translation result includes a translation error such as a 'left'-'right' mistranslation by using stage (risk level) information. A user's easy acceptance of a mistranslation such as a 'left'-'right' mistranslation may be avoided.

Further, on the basis of the evaluation result, reference translation examples are generated and displayed in addition to the alert information. Therefore, by using the alert information and the reference translation examples, a user may overall determine whether or not the translation result from the translation unit 27 includes a translation error such as a 'left'-'right' mistranslation. A user's easy acceptance of a mistranslation such as a 'left'-'right' mistranslation may be avoided without fail.

As a result, in the case where the translation result from the translation apparatus 20a possibly includes, for example, a mistranslation of 'left'-'right' antonyms, attention to the fact may be called. Thus, the translation processing apparatus 1a according to the second embodiment is useful in providing an automatic translation service, for example, for route guidance use or operation instruction use in which, for example, a 'left'-'right' mistranslation is fatal.

In the embodiments described above, the case in which 'right' and 'left' are used as antonyms is taken as an example. However, this example is not particularly limiting. For other antonyms such as "up" and "down", substantially the same effects as described above may be obtained.

The present disclosure achieves an easy, appropriate evaluation of a possibility of mistranslation in parallel texts including antonyms. Therefore, the present disclosure is useful for a processing method, a processing apparatus, and a recording medium for recording a processing program. The processing method, processing apparatus, and the processing program process parallel text data (parallel texts) including an input text described in a first language and a translation of the input text into the second language.

What is claimed is:

1. A processing method for a processing apparatus which processes parallel text data, the parallel text data including an input text in a first language and a translation of the input text in a second language, the method comprising:

acquiring, by a processor, first parallel text data including a pair of a first text in the first language and a first translation of the first text in the second language;

evaluating, by the processor, a possibility of mistranslation of the first parallel text data on the basis of words included in the first text and the first translation; and outputting, by the processor, information based on a result of the evaluation, wherein the evaluation of the possibility of mistranslation is performed on the basis of results of a first determination and a second determination, the first determination being a determination of presence or absence of a first keyword in the first text, the second determination being a determination of presence or absence of a second keyword in the first translation, wherein the first keyword includes at least one of a word in the first language and an antonym of the word in the first language, and wherein the second keyword includes at least one of a translation of the word in the second language and an antonym of the translation of the word in the second language.

2. The processing method according to claim 1, wherein the evaluation is performed on the basis of the results of the first determination and the second determination, the first determination being a determination as to whether or not the first text includes the word with the first meaning and the antonym of the word, the second determination being a determination as to whether or not the first translation includes the translation word with the first meaning and the antonym of the translation word.

3. The processing method according to claim 1, wherein the evaluation is performed on the basis of the results of the first determination and the second determination, the first determination being a determination as to whether or not the first text includes a first word and excludes a second word, the first word being either the word with the first meaning or the antonym of the word, the second word being a word other than the first word between the word with the first meaning and the antonym of the word, the second determination being a determination as to whether or not the first translation excludes a first translation word and includes a second translation word, the first translation word being a translation of the first word, the second translation word being a translation of the second word.

4. The processing method according to claim 1, wherein the evaluation is performed on the basis of the results of the first determination and the second determination, the first determination being a determination as to whether or not the first text includes a first word that is either the word with first meaning or the antonym of the word, the second determination being a determination as to whether or not the first translation excludes a first translation word that is a translation of the first word.

5. The processing method according to claim 1, wherein the evaluation is performed on the basis of the results of the first determination and the second determination, the first determination being a determination as to whether or not the first text excludes a first word that is either the word with the first meaning or the antonym of the word, the second determination being a determination as to whether or not the first translation includes a first translation word that is a translation of the first word.

6. The processing method according to claim 1, wherein the acquisition acquires the first parallel text data from a parallel-corpus storage unit, and the parallel-corpus storage unit stores a parallel corpus including a plurality of pairs of a text described in the first language and a translation of the first-language text into the second language.

7. The processing method according to claim 6, wherein the outputting generates a training parallel corpus on the basis of the evaluation result.

8. The processing method according to claim 7, wherein the outputting generates the training parallel corpus in such a manner that, on the basis of the evaluation result, the parallel text data having no possibility of mistranslation is employed for the training parallel corpus, and that the parallel text data having the possibility of mistranslation is not employed for the training parallel corpus.

9. The processing method according to claim 7, wherein the outputting generates the training parallel corpus in such a manner that, on the basis of the evaluation result, the parallel text data having no possibility of mistranslation is employed for the training parallel corpus and that modified parallel text data is employed for the training parallel corpus, the modified parallel text data being obtained by modifying the parallel text data having the possibility of mistranslation, the modification being made in such a manner that the parallel text data does not have the possibility of mistranslation.

10. The processing method according to claim 7, wherein the training parallel corpus is used to learn a translation model.

11. The processing method according to claim 1, wherein the acquisition acquires the first parallel text data from a translation apparatus that translates the first text into the first translation.

12. The processing method according to claim 11, wherein the outputting generates, for display, alert information on the basis of the evaluation result.

13. The processing method according to claim 12, wherein the outputting generates first alert information and second alert information as the alert information on the basis of the evaluation result, the first alert information indicating a first possibility as the possibility of mistranslation, the second alert information indicating a second possibility as the possibility of mistranslation, the second possibility being higher than the first possibility.

14. The processing method according to claim 12, wherein the outputting generates, for display, a reference translation example on the basis of the evaluation result, the reference translation example being added to the alert information.

15. The processing method according to claim 1, wherein a word included in the first text or the first translation indicates 'right' or 'left'.

16. A processing apparatus which processes parallel text data, the parallel text data including an input text described in a first language and a translation of the input text into a second language, the apparatus comprising:
a memory including executable instructions; and
a processor that executes the instructions and performs:
acquiring first parallel text data including a pair of a first text in the first language and a first translation of the first text in the second language;
evaluating a possibility of mistranslation of the first parallel text data on the basis of words included in the first text and the first translation; and
outputting information based on a result of the evaluation,
wherein the evaluation of the possibility of mistranslation is performed on the basis of results of a first determination and a second determination, the first determination being a determination of presence or absence of a first keyword in the first text, the second determination being a determination of presence or absence of a second keyword in the first translation, wherein the first keyword includes at least one of a word in the first language and an antonym of the word in the first language, and wherein the second keyword includes at least one of a translation of the word in the second language and an antonym of the translation of the word in the second language.

17. A non-transitory recording medium storing a processing program causing a computer to function as a processing apparatus, the processing apparatus processing parallel text data, the parallel text data including an input text in a first language and a translation of the input text in a second language, the processing program causing the computer to execute a process comprising:

acquiring, by a processor, first parallel text data including a pair of a first text in the first language and a first translation of the first text in the second language;

evaluating, by the processor, a possibility of mistranslation of the first parallel text data on the basis of words included in the first text and the first translation; and outputting, by the processor, information based on a result of the evaluation, wherein the evaluating the possibility of mistranslation is performed on the basis of results of a first determination and a second determination, the first determination being a determination of presence or absence of a first keyword in the first text, the second determination being a determination of presence or absence of a second keyword in the first translation, wherein the first keyword includes at least one of a word in the first language and an antonym of the word in the first language, and wherein the second keyword includes at least one of a translation of the word in the second language and an antonym of the translation of the word in the second language.

* * * * *